(12) United States Patent
Rauscher et al.

(10) Patent No.: US 11,428,368 B1
(45) Date of Patent: Aug. 30, 2022

(54) METHOD OF MAKING A FIBER REINFORCED ENERGETIC COMPOSITE

(71) Applicant: Cornerstone Research Group, Inc., Miamisburg, OH (US)

(72) Inventors: Michael D. Rauscher, Dayton, OH (US); Thomas J. Barnell, Dayton, OH (US); Gary N. Cupp, Waynesville, OH (US); Michael J. Fisher, Springboro, OH (US); Ryan D. Snyder, Kettering, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 338 days.

(21) Appl. No.: 16/853,079

(22) Filed: Apr. 20, 2020

Related U.S. Application Data

(62) Division of application No. 15/355,848, filed on Nov. 18, 2016, now Pat. No. 10,670,186.

(Continued)

(51) Int. Cl.
*B29C 70/30* (2006.01)
*B29C 70/68* (2006.01)
*F17C 1/04* (2006.01)
*B29L 31/00* (2006.01)
*B29K 105/16* (2006.01)

(52) U.S. Cl.
CPC ............... *F17C 1/04* (2013.01); *B29C 70/30* (2013.01); *B29C 70/68* (2013.01); *B29K 2105/162* (2013.01); *B29L 2031/712* (2013.01); *F17C 2203/0607* (2013.01);

(Continued)

(58) Field of Classification Search
None
See application file for complete search history.

(56) References Cited

U.S. PATENT DOCUMENTS 3,155,749 A 11/1964 Rossen et al.
3,309,249 A 3/1967 Allen
(Continued)

OTHER PUBLICATIONS https://www.dictionary.com/browse/entrainment, pp. 1, 2022, Dictionary. com (Year: 2022).*

(Continued)

*Primary Examiner* — Lee E Sanderson
*Assistant Examiner* — Michael C Romanowski
(74) *Attorney, Agent, or Firm* — Dinsmore & Shohl LLP

(57) ABSTRACT

A method of making a fiber reinforced energetic composite is provided. The method includes providing a mold or mandrel defining a shape for the fiber reinforced energetic composite, providing an impregnated fiber layup over the mold or mandrel, and curing the impregnated fiber layup. The impregnated fiber layup includes a fiber layup and polymer resin, the fiber layup formed from a plurality of reinforcing fiber layers and an energetic polymer nanocomposite disposed adjacent one or more of the reinforcing fiber layers with the polymer resin impregnated within the reinforcing fiber layers. The energetic polymer nanocomposite includes core-shell nanoparticles entrained in a thermoplastic polymer matrix where the core-shell nanoparticles include a core made of metal and at least one shell layer made of metal oxide disposed on the core or a core made of metal oxide and at least one shell layer made of metal disposed on the core.

17 Claims, 10 Drawing Sheets

Related U.S. Application Data

(60) Provisional application No. 62/256,751, filed on Nov. 18, 2015.

(52) U.S. Cl.
CPC ............... *F17C 2203/0636* (2013.01); *F17C 2203/0663* (2013.01); *F17C 2270/0197* (2013.01)

(56) References Cited

U.S. PATENT DOCUMENTS

| | | | |
|---|---|---|---|
| 3,322,515 A | | 5/1967 | Dittrich et al. |
| 3,995,559 A | | 12/1976 | Bice et al. |
| 4,478,151 A | * | 10/1984 | Vetter .................. F02K 9/38 102/289 |
| 4,923,535 A | | 5/1990 | Waters et al. |
| 5,606,146 A | | 2/1997 | Danen et al. |
| 5,703,173 A | | 12/1997 | Koloski et al. |
| 5,977,241 A | | 11/1999 | Koloski et al. |
| 6,232,386 B1 | | 5/2001 | Vargo et al. |
| 6,363,855 B1 | * | 4/2002 | Kim .................. F42B 39/20 102/378 |
| 6,548,590 B1 | | 4/2003 | Koloski et al. |
| 6,562,159 B2 | | 5/2003 | Ampleman et al. |
| 6,608,129 B1 | | 8/2003 | Koloski et al. |
| 7,217,754 B2 | | 5/2007 | Koloski et al. |
| 7,233,312 B2 | | 6/2007 | Stern et al. |
| 7,635,461 B2 | | 12/2009 | Anderson |
| 7,927,437 B2 | | 4/2011 | Gangopadhyay et al. |
| 8,066,831 B2 | | 11/2011 | Gangopadhyay et al. |
| 8,177,878 B2 | | 5/2012 | Heinrich et al. |
| 8,257,523 B1 | | 9/2012 | Puszynski et al. |
| 8,356,727 B2 | * | 1/2013 | Traxler .................. F42D 5/045 220/745 |
| 9,233,883 B1 | | 1/2016 | Rauscher et al. |
| 9,446,994 B1 | | 9/2016 | Rauscher et al. |
| 2004/0019143 A1 | | 1/2004 | Koloski et al. |
| 2008/0102266 A1 | | 5/2008 | Nakatsuka et al. |
| 2010/0032064 A1 | | 2/2010 | Dreizin et al. |
| 2010/0279102 A1 | | 11/2010 | Gangopadhyay et al. |
| 2011/0017897 A1 | | 1/2011 | Christoffel et al. |
| 2011/0127314 A1 | | 6/2011 | Heinrich et al. |
| 2012/0132644 A1 | | 5/2012 | Gu et al. |
| 2014/0014667 A1 | | 1/2014 | Flammer |
| 2014/0227548 A1 | | 8/2014 | Myrick |
| 2014/0251612 A1 | * | 9/2014 | Powers ................ B29C 48/154 166/281 |

OTHER PUBLICATIONS https://www.dictionary.com/browse/entrain, pp. 3, 2022, Dictionary.com (Year: 2022).*

Delogu, "Numerical simulation of the thermal response of Al core/Ni shell nanometer-sized particles", Nanotechnology, IOP Publishing Ltd., pp. 1-7, 2007.

Evteev et al., "Reaction of a Ni-coated Al nanoparticle to form B2—NiAl: A Molecular Dynamics Study", Philosophical Magazine Letters, vol. 89, No. 12, pp. 815-830, Dec. 2009.

Levchenko et al., "Molecular dynamics simulation of the alloying reaction in Al-coated Ni nanoparticle", Elsevier Science Direct, Computational Materials Science 47, pp. 712-720, 2010.

Nguyen et al., "Molecular dynamics simulation of energetic aluminum/palladium core-shell nanoparticles", Elsevier Science Direct, Chemical Physics Letters 503, pp. 112-117, 2011.

Song et al., "Molecular Dynamics Simulation of a Core-Shell Structured Metallic Nanoparticle", J. Phys. Chem. C 114, pp. 8688-8696, 2010.

Sullivan et al., "Ignition and Combustion Characteristics of Nanoscale Al/AgIO3", A Potential Energetic Biocidal System, Combus. Sci and Tech 183, pp. 285-302, 2011.

Sullivan et al., "Reactive sintering: An important component in the combustion of nanocomposite thermites", Elsevier Science Direct, Combustion and Flame 159, pp. 2015, 2012.

Prakash et al., "Tuning the Reactivity of Energetic Nanoparticles by Creation of a Core-Shell Nanostructure", Nano Letters, vol. 5, No. 7, pp. 1357-1360, 2005.

Piercey et al., "Nanoscale Aluminum—Metal Oxide (Thermite) Reactions for Application in Energetic Materials", Central European Journal of Energetic Materials 2(2), pp. 115-129, 2010.

* cited by examiner

METHOD OF MAKING A FIBER REINFORCED ENERGETIC COMPOSITE

CROSS-REFERENCE TO RELATED APPLICATIONS

This application is a Divisional of U.S. application Ser. No. 15/355,848, filed Nov. 18, 2016 which claims the benefit of U.S. Provisional Application No. 62/256,751, filed Nov. 18, 2015.

STATEMENT REGARDING FEDERALLY SPONSORED RESEARCH OR DEVELOPMENT

This invention was made with government support by the Missile Defense Agency under Contract Number HQ0147-15-C-7116. The government has certain rights in this application pursuant to the contract.

BACKGROUND

The present disclosure relates to fiber reinforced energetic composites having a substrate of reinforcing fiber and an energetic polymer nanocomposite disposed therein.

A problem which may arise with ammunition, propellant, or fuel in a closed environment is a phenomenon known as fast cook-off. Cook-off is unintended detonation of the ammunition, propellant, or fuel due to heat in the surrounding environment and a fast cook-off is a cook-off caused by a fire or intense heat source in the region of the ammunition, propellant, or fuel. A rocket motor case in transport is loaded with substantial quantity of high energy density propellant or fuel. If a fire arises during the transportation of the motor case, the substantial quantity of propellant or fuel can be ignited and result in an explosion and a fast cook-off event. In the event of a fire, it is desirable to release the pressure built up inside the motor case to prevent explosive ignition or fast cook-off of the fuel bolus while enclosed within the motor case. Current venting systems only vent in discrete areas where a specialized venting mechanism is present. These existing systems do not account for heat sources far from the defined locations of the venting mechanism on the rocket motor casing. Additionally, fuel may only be vented proximate the discrete venting locations which allows for potentially dangerous pressure to build up away from the venting mechanism.

BRIEF SUMMARY

It is desirable to provide a venting system for rocket motor cases which allows for venting over the entirety of the rocket motor case and not only in specific discrete areas. It is additionally desirable for the venting system to be passive requiring no external activation or sensing to activate the venting mechanism. It is further desirable to initiate complete destruction of the integrity of the rocket motor case to fully and quickly exhaust the entire fuel bolus without a pressure build-up which may result in an explosive spray or distribution of fuel and fire over an enlarged region.

The subject matter of the present disclosure is directed to a fiber reinforced energetic composite comprising energetic polymer nanocomposite comprising core-shell nanoparticles entrained in a polymer matrix. The core-shell nanoparticles comprise multiple layers. A method of producing the fiber reinforced energetic composite is also provided.

In accordance with one embodiment of the present disclosure, a fiber reinforced energetic composite is provided. The fiber reinforced energetic composite includes reinforcing fiber embedded in a cured polymer matrix, and energetic polymer nanocomposite disposed between the reinforcing fibers. The energetic polymer nanocomposite includes core-shell nanoparticles entrained in a polymer matrix. The core-shell nanoparticles include a core made of a metal and at least one shell layer made of a metal oxide disposed on the core. The core-shell nanoparticles may alternately include a core made of a metal oxide and at least one shell layer made of a metal disposed on the core.

In accordance with another embodiment of the present disclosure, a composite container is provided. The composite container includes a container housing made of a fiber reinforced energetic composite. The fiber reinforced energetic composite includes reinforcing fiber embedded in a cured polymer matrix, and energetic polymer nanocomposite disposed in the reinforcing fiber. The energetic polymer nanocomposite includes core-shell nanoparticles entrained in a polymer matrix. The core-shell nanoparticles include a core made of a metal and at least one shell layer made of a metal oxide disposed on the core. The core-shell nanoparticles may alternately include a core made of a metal oxide and at least one shell layer made of a metal disposed on the core.

In accordance with still another embodiment of the present disclosure, a method of making a fiber reinforced energetic composite is provided. The method includes providing a mold or mandrel defining a shape for the fiber reinforced energetic composite, providing an impregnated fiber layup over the mold or mandrel, and curing the impregnated fiber layup to produce the fiber reinforced energetic composite. The impregnated fiber layup comprises a fiber layup and polymer resin, the fiber layup formed from a plurality of reinforcing fiber layers and an energetic polymer nanocomposite disposed adjacent one or more of the plurality of reinforcing fiber layers with the polymer resin impregnated within the plurality of reinforcing fiber layers, and curing the resin impregnated fiber layup to produce the fiber reinforced energetic composite. The energetic polymer nanocomposite includes core-shell nanoparticles entrained in a thermoplastic polymer matrix. The core-shell nanoparticles include a core made of a metal and at least one shell layer made of a metal oxide disposed on the core, the metal and metal oxide forming a thermite. The core-shell nanoparticles may alternately include a core made of a metal oxide and at least one shell layer made of a metal disposed on the core. The impregnation of polymer resin occurs by one or more of the following: wetting the reinforcing fiber layers with the polymer resin before applying the reinforcing fiber layers over the mold or mandrel, infusing the reinforcing fiber layers with polymer resin after applying the reinforcing fiber layers over the mold or mandrel, or supplying prepreg reinforcing fiber layers. The prepreg reinforcing fiber layers include polymer resin already impregnated into the reinforcing fiber layers.

In accordance with yet another embodiment of the present disclosure, a method of making a fiber reinforced energetic composite is provided. The method includes providing a mold defining a shape for the fiber reinforced energetic composite, applying a plurality of reinforcing fiber layers over the mold and applying energetic polymer nanocomposite in powder form onto and between the reinforcing fiber layers to produce a fiber layup, covering the mold and fiber layup in a vacuum enclosure, infusing the fiber layup with a mixture of uncured polymer resin, and curing agent under vacuum conditions, and curing the infused fiber layup to produce the fiber reinforced energetic composite. The energetic polymer nanocomposite powder includes core-shell nanoparticles entrained in a polymer matrix. The core-shell nanoparticles include a core made of a metal and at least one shell layer made of a metal oxide disposed on the core. The core-shell nanoparticles may alternately include a core made of a metal oxide and at least one shell layer made of a metal disposed on the core.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
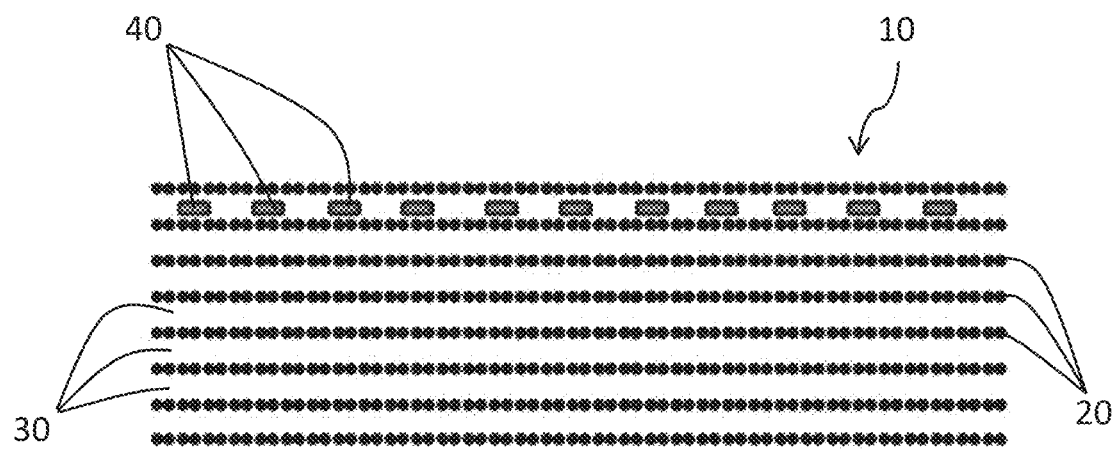
FIG. 1 is a schematic illustration of a fiber reinforced energetic composite according to one or more embodiments of the present disclosure.
Figure 2:
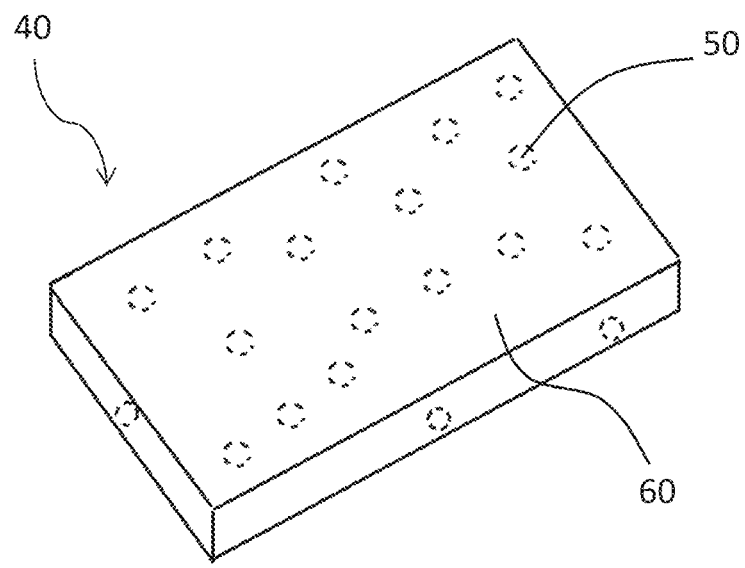
FIG. 2 is a schematic illustration of an energetic polymer nanocomposite according to one or more embodiments of the present disclosure.
Figure 3:
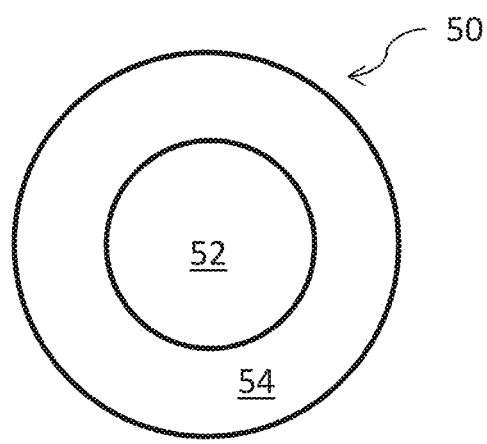
FIG. 3 is a schematic illustration of a core-shell nanoparticle according to one or more embodiments of the present disclosure.

Referring to the drawings in general and to FIG. 1, FIG. 2, and FIG. 3 in particular, it will be understood that the illustrations are for the purpose of describing a particular embodiment of the invention and are not intended to limit the invention thereto. A fiber reinforced energetic composite 10 comprises a reinforcing fiber 20 embedded in a cured polymer matrix 30, and an energetic polymer nanocomposite 40 disposed in the reinforcing fiber 20. The energetic polymer nanocomposite 40 comprises core-shell nanoparticles 50 entrained in a polymer matrix 60. The core-shell nanoparticles 50 comprise a core 52 comprising a metal and at least one shell layer 54 comprising a metal oxide disposed on the core 52 or a core 52 comprising a metal oxide and at least one shell layer 54 comprising a metal disposed on the core 52.

In one or more embodiments, the polymer matrix 60 comprises a thermoplastic polymer. The polymer matrix may be provided in a variety of configurations. Non-limiting examples include thermoplastic polymer fibers, thermoplastic polymer filaments, thermoplastic polymer tapes, thermoplastic polymer powder, thermoplastic polymer films, thermoplastic polymer coating, thermoplastic polymer fiber sizing, or combinations thereof. A filament is considered a slender threadlike object or fiber and is a single continuous strand. A thermoplastic polymer filament may be formed by drawing a thermoplastic polymer to form the thin threadlike filament. In various embodiments, the thermoplastic polymer filament may have a diameter in the range of 10 micrometers (µm) to 3 mm (millimeters), 100 µm to 2 mm, or 200 µm to 1 mm. Similarly, a thermoplastic fiber may be continuous or spun from short filaments. A tape is considered a narrow strip of material with a width in excess of a thickness. In various embodiments, the thermoplastic polymer tape may have a width of 0.0625 inch to 1 inch, 0.1 inch to 0.75 inch, 0.15 inch to 0.5 inch, and 0.2 inch to 0.3 inch.

In an embodiment, thermoplastic polymer powder may be sprinkled or sprayed onto the dry reinforcing fiber 20 during the fiber layup process. In further embodiments, continuous thermoplastic film may be used in making a prepreg reinforcing fiber 20 or as part of the prepreg layup in composite fabrication. Thermoplastic films may also be perforated to allow the uncured resin to impregnate the reinforcing fiber during a resin infusion step of composite fabrication. In further embodiments, the reinforcing fibers, fabric, or prepreg may be coated with thermoplastic coating or sizing before being used in composite fabrication processes such as filament winding and fiber layup.

In an embodiment, the thermoplastic polymer filaments or fibers are woven into a strip or sheet to form a woven polymer matrix. The woven polymer matrix may be loosely woven with gaps between the thermoplastic polymer filaments or fibers. In various embodiments the ratio of area of thermoplastic polymer to area of the gaps is 100:1 to 1:1000, 1:1 to 1:500, 1:3 to 1:100, or 1:4 to 1:50.

The polymer matrix 60 may comprise a variety of thermoplastic polymers. In an embodiment, the polymer matrix 60 comprises cellulose acetate butyrate (CAB). In a further embodiment, the polymer matrix 60 comprises polyethersulfone (PES). In a variety of further embodiments, the polymer matrix 60 comprises polyimides, polyamides, polyalkylenes, modified cellulose derivatives, starches, polyesters, polymethacrylates, polyacrylates, polyvinyl alcohol, polyvinyl acetate, polybutadiene, polyvinylpyrrolidone, polyacrylamide, poly(alkylene oxides), poly(vinyl chloride), polysiloxanes, or fluoropolymers, such as polyfluoroalkylenes, poly(fluoroalkyl vinyl ethers), fluorochloropolymers, and perfluoropolymers.

In various embodiments, the reinforcing fiber 20 comprises filament, fiber, tape, scrim, woven thread, or combinations thereof. As discussed with regards to the polymer matrix 60, a filament is considered a slender threadlike object or fiber and a tape is considered a narrow strip of material with a width in excess of a thickness. In various embodiments the filament may have a diameter in the range of 10 micrometers (μm) to 3 mm (millimeters), 100 μm to 2 mm, or 200 μm to 1 mm. In various embodiments, the tape has a width of 0.0625 inch to 1 inch, 0.1 inch to 0.75 inch, 0.15 inch to 0.5 inch, and 0.2 inch to 0.3 inch. Further, in various embodiments, the tape may have a thickness of 0.001 inch to 0.125 inch, 0.005 inch to 0.120 inch, 0.008 inch to 0.110 inch, and 0.01 inch to 0.1 inch. A scrim is formed from a carbon veil with the energetic polymer nanocomposite 40 fused on in a heat press. The scrim provides a mesh of energetic polymer nanocomposite 40 for placement in the fiber reinforced energetic composite 10. A scrim is a two dimensional random or oriented mesh which provides continuous paths of nanocomposite filament in 2-dimensions. Further, a woven thread provides increase tensile strength of individual filaments by weaving the individual filament fibers into a cohesive threadlike structure. In a further embodiment, the reinforcing fiber 20 comprises a plurality of woven sheets of reinforcing fibers.

In various embodiments, the reinforcing fiber 20 comprises carbon fiber, glass fiber, reinforcing polymer fiber, or combinations thereof. For example, the reinforcing fiber 20 may comprise woven sheets of carbon fiber. Non-limiting examples of reinforcing polymer fiber include aramid fibers (Kevlar® from DuPont, Nomex® from DuPont, Twaron® from Teijin, Technora® from Teijin, Conex® from Teijin), ultra-high molecular weight polyethylene fibers (Spectra® from Honeywell, Dyneema® from DSM), and spun liquid crystal polymer (Vectran® from Kuraray Co., Ltd.).

In an embodiment, the cured polymer comprises epoxy, vinyl ester, polyurethane, phenolic resin, cyanate ester, polyimide, or combinations thereof. In an embodiment, the epoxy resin may be EPON™ 862 resin (Hexion, Columbus, Ohio) cured with Epikure™ W cure agent (Hexion, Columbus, Ohio).

As previously indicated, the core-shell nanoparticles comprise a core 52 comprising a metal and at least one shell layer 54 comprising a metal oxide disposed on the core 52 or a core 52 comprising a metal oxide and at least one shell layer 54 comprising a metal disposed on the core 52. In various embodiments, the metal is elemental aluminum, boron, lithium, beryllium, or combinations thereof and the metal oxide is iron oxide or copper oxide. In an embodiment, the metal is elemental aluminum and the metal oxide is iron oxide.

The layer arrangement of the core-shell nanoparticles 50 may be diverse among the various embodiments. In an embodiment, the core-shell nanoparticles 50 comprise "n" repeating iterations of layers of a core 52 and a shell layer 54, wherein "n" is at least 1 and the material of the core 52 and shell layer 54 are distinct. In accordance with FIG. 3 for "n" equals 1, the core 52 is formed from a first material and the shell layer 54 is formed from a second material. In various further embodiments, "n" is 2, 3, 4, 5, or 50 for example.

In a further embodiment, the core-shell nanoparticles 50 comprise "k" repeating iterations of layers of a first shell layer 54 and a second shell layer 56, wherein "k" is at least 1 and the materials of the first shell layer 54 and the second shell layer 56 are distinct. In at least one embodiment, the core 52 is different than both the first shell layer 54 and the second shell layer 56. In various further embodiments, "k" is 2, 3, 4, 5, or 50 for example.

In a further embodiment, the core-shell nanoparticles 50 comprise "j" repeating iterations of layers of a first shell layer 54, a second shell layer 56, and a third shell layer 58, wherein "j" is at least 1 and the materials of the first shell layer 54, the second shell layer 56, and the third shell layer 58 are distinct. In at least one embodiment, the core 52 is different than any of the first shell layer 54, the second shell layer 56, or the third shell layer 58. In at least one embodiment, the material of the core 52 is the same as at least one of the first shell layer 54, the second shell layer 56, or the third shell layer 58. In accordance with FIG. 4 for "j" equals 1, the core 52 is formed from a first material and the shell layers 54, 56, 58 are formed from a second, third, and fourth material respectively or the shell layers 54, 56, 58 are formed from a second, and third material with one of the shell layers 54, 56, 58 matching the material of the core 52. In various further embodiments, "j" is 2, 3, 4, 5, or 50 for example.

In a further embodiment, the shell layers 54, 56, 58 form an uninterrupted coating over the core 52. An uninterrupted coating over the core 52 prevents exposure of the core 52 to external elements. Additionally, an uninterrupted coating as the first shell 54 over the core 52 allows the core 52 and the second shell 56 to be separated by a barrier layer of the first shell 54. This may be desirable when reactive species are used as different shell layers 54, 56, 58 or core 52 of the core-shell nanoparticles 50.

In an embodiment, the core-shell nanoparticles 50 have a mean average diameter of less than approximately 30 nm. In a further embodiment, the core-shell nanoparticles 50 have a mean average diameter of approximately 30 nm to approximately 100 nm. In still a further embodiment the core-shell nanoparticles 50 have a mean average diameter of approximately 5 nm to approximately 50 nm.

Figure 4:
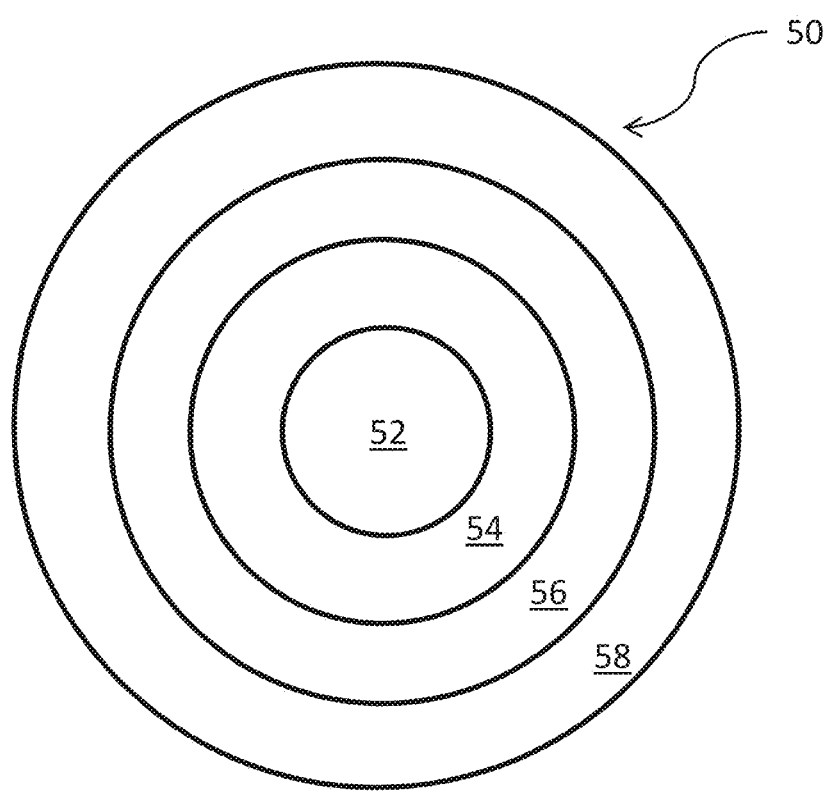
FIG. 4 is a schematic illustration of a core-shell nanoparticle according to one or more embodiments of the present disclosure.

In an embodiment, the core-shell nanoparticle 50 layer-by-layer fabrication approach can be leveraged to form nanoparticles of thermite fuel, barrier layer, and oxidizer systems to form a core-shell nanothermite. The barrier layer may comprise, for example, organic molecules, polymers, metal, and inorganic oxides. The alternating layers of metal fuel and metal-oxide oxidizer can be in intimate contact or separated by a barrier layer to provide additional insensitivity. The specific architecture of the core-shell nanoparticles 50 configured as thermite can vary including repeated alternating layers of metal fuel and metal-oxide oxidizer with or without barrier layers. With reference to FIG. 4, a core-shell nanothermite may have a core 52 of the metal fuel, a shell layer 54 of metal oxide, a shell layer 56 of metal fuel, and a shell layer 58 of metal oxide. In an embodiment, the metal fuel is elemental aluminum and the metal-oxide is iron oxide. Further, non-limiting examples of metal fuel include boron, lithium, and beryllium. Further, non-limiting examples of metal-oxide include copper oxide and cobalt oxide.

While throughout this disclosure reference is made to shell layers 54, 56, 58 and FIG. 4 shows 3 distinct shell layers, it is contemplated within the scope of this disclosure to have 10s, 100s, or even 1000s of shell layers. Illustration and discussion of 3 shell layers is merely for simplicity.

Additional guidance on metal based nanoparticles in a polymer matrix and forming the same is respectively provided in U.S. Pat. No. 9,446,994 issued Sep. 20, 2016 and U.S. Pat. No. 9,233,883 issued Jan. 12, 2016 both entitled "Polymer Composite Comprising Metal Based Nanoparticles in a Polymer Matrix" and which are hereby incorporated in their entirety.

With reference to FIG. 2, the energetic polymer nanocomposite 40 comprises core-shell nanoparticles 50 entrained in a polymer matrix 60. In an embodiment, the energetic polymer nanocomposite 40 comprises 1 to 50 wt % of the core-shell nanoparticles 50. In further embodiments, the energetic polymer nanocomposite 40 comprises 2 to 40 wt % of the core-shell nanoparticles 50, 3 to 30 wt % of the core-shell nanoparticles 50, 4 to 20 wt % of the core-shell nanoparticles 50, or 5 to 15 wt % of the core-shell nanoparticles 50.

With reference to FIG. 1, the amount of energetic polymer nanocomposite 40 in the fiber reinforced energetic composite 10 may vary between embodiments. In an embodiment, the fiber reinforced energetic composite 10 comprises 0.1 to 10 wt % of the energetic polymer nanocomposite 40. In further embodiments, the fiber reinforced energetic composite 10 comprises 0.2 to 8 wt % of the energetic polymer nanocomposite 40, 0.4 to 6 wt % of the energetic polymer nanocomposite 40, 0.6 to 4 wt % of the energetic polymer nanocomposite 40, or 0.8 to 2 wt % of the energetic polymer nanocomposite 40. Varying the amount of energetic polymer nanocomposite 40 in the fiber reinforced energetic composite 10 may allow for fine tuning of the sensitivity of the energetic response of the fiber reinforced energetic composite 10 to the material and/or operational needs, such as in a fire exposure situation. For example, without wishing to be bound by theory, it is believed that epoxy, vinyl ester, or polyurethane may all function as acceptable cured polymer 30 with a lesser wt % of energetic polymer nanocomposite 40 in the fiber reinforced energetic composite 10 as compared to a phenolic, cyanate ester, or polyimide as the cured polymer 30.

The wt % of the energetic polymer nanocomposite in the fiber reinforced energetic composite 10 may be lesser when the wt % of core-shell nanoparticles 50 is greater in the energetic polymer nanocomposite 40. For example, an embodiment where the fiber reinforced energetic composite 10 comprises 0.1 wt % of the energetic polymer nanocomposite 40 may be suitable for an energetic polymer nanocomposite 40 which comprises 50 wt % of the core-shell nanoparticles 50.

In an embodiment, the energetic polymer nanocomposite 40 is formed from processing a fine powder of core-shell nanoparticles 50 embedded in thermoplastic through an extruder for consolidation. From the extruder, the fine powder of core-shell nanoparticles embedded in thermoplastic may exit a die to form a filament which may be passed through a roller assembly to form a flattened ribbon of material. The thickness and width of the formed ribbon of material is dependent on the temperature, flow rate, roller spacing, and roller draw speed. In an embodiment, the fine powder of core-shell nanoparticles 50 embedded in thermoplastic is also compounded with other polymers or fillers to adjust the properties of the resulting energetic polymer nanocomposite 40. Non-limiting examples include plasticizers and toughening agents.

Figure 8:
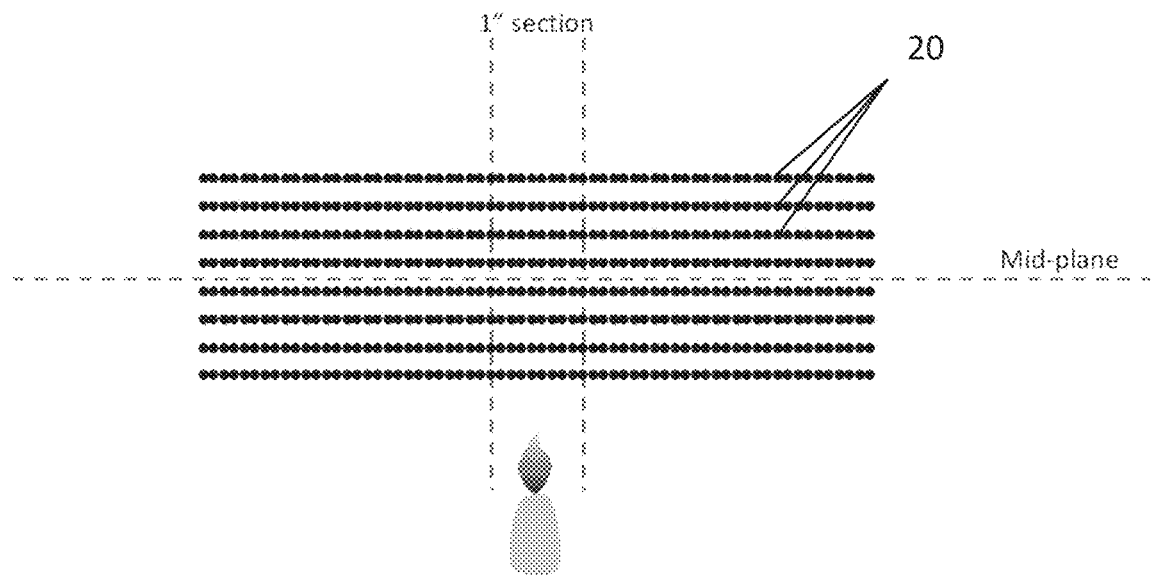
FIG. 8 is a schematic illustration of a comparative fiber reinforced composite with no energetic polymer nanocomposite used for simulated fast cook-off testing.

With reference to FIGS. 1 and 8, in an embodiment, the fiber reinforced energetic composite 10 has the energetic polymer nanocomposite 40 disposed between layers of the reinforcing fiber 20. The fiber reinforced energetic composite 10 includes multiple layers of the reinforcing fiber 20 which in combination with the cured polymer 30 form a reinforced composite material. Disposing the energetic polymer nanocomposite 40 between layers of the reinforcing fiber 20 allows for the addition of the core-shell nanoparticles 50 to the fiber reinforced energetic composite 10 without significantly changing the strength and mechanical properties of the fiber reinforced energetic composite 10.

In an embodiment, the energetic polymer nanocomposite 40 is disposed between layers of the reinforcing fiber 20 proximate one or more surfaces of the fiber reinforced energetic composite 10. In some embodiments, the energetic polymer nanocomposite 40 is disposed proximal an inner surface of the fiber reinforced energetic composite 10 such as the interior of a composite tank. In some embodiments, the energetic polymer nanocomposite 40 is disposed proximal an outer surface of the fiber reinforced energetic composite 10 such as the exterior surface of a composite tank. In yet another embodiment, the energetic polymer nanocomposite 40 is disposed substantially at the mid plane through the thickness of the fiber reinforced energetic composite 10. In other embodiment, the energetic polymer nanocomposite 40 is disposed uniformly, or at multiple locations across the cross section of the fiber reinforced energetic composite 10. In an embodiment, the energetic polymer nanocomposite 40 is disposed at a distance less than 50% based on overall thickness from one or more surfaces of the fiber reinforced energetic composite 10. In various embodiments, the energetic polymer nanocomposite 40 is disposed at a distance less than 40%, less than 30%, less than 25%, less than 20%, less than 15%, less than 10%, less than 5%, or less than 2% based on overall thickness from one or more surfaces of the fiber reinforced energetic composite 10.

Figure 5:
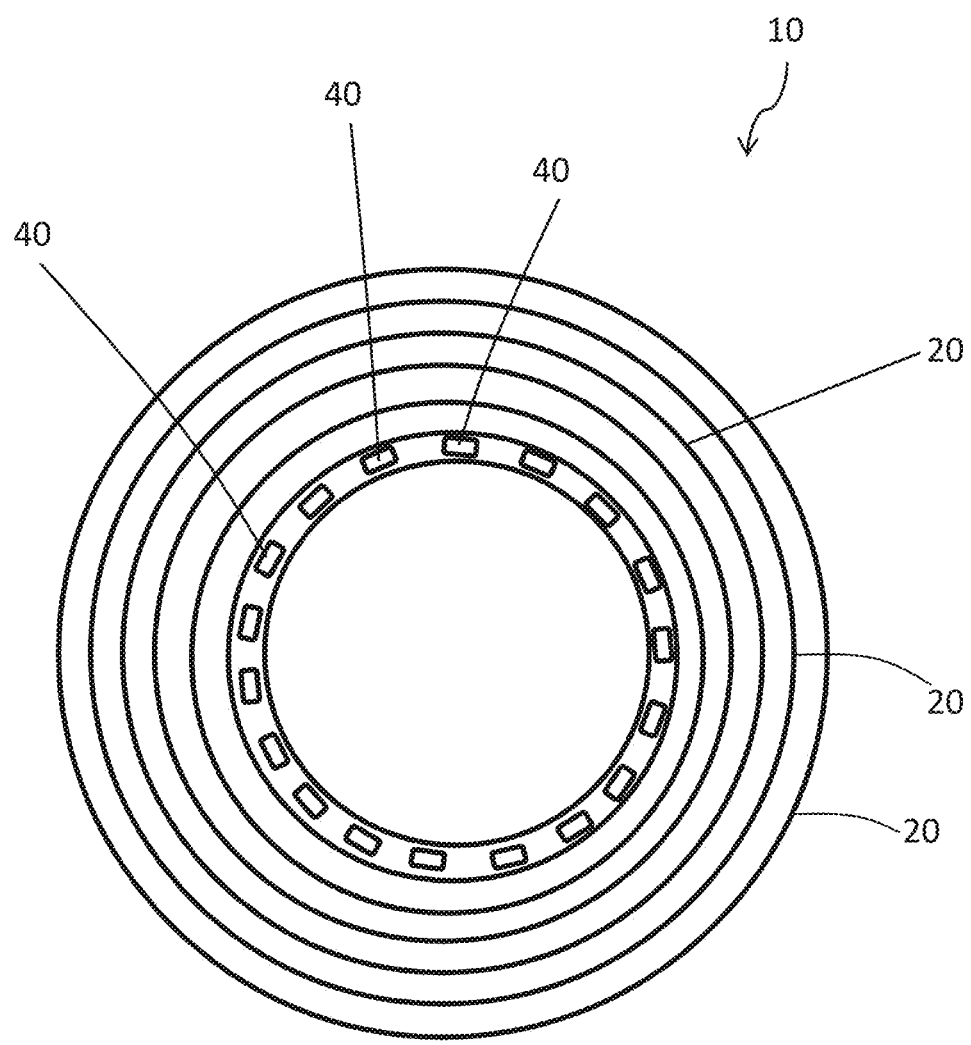
FIG. 5 is a schematic illustration of the layer profile of the cross section of a composite container according to one or more embodiments of the present disclosure.

With reference to FIG. 5, in an embodiment, the fiber reinforced energetic composite 10 is provided as a composite container. The composite container comprises a container housing comprising the fiber reinforced energetic composite 10. In an embodiment, the energetic polymer nanocomposite 40 is disposed between layers of the reinforcing fiber 20 at a distance at or less than 50% based on overall thickness of the fiber reinforced energetic composite 10 from one or more internal surfaces of the composite container. In various embodiments, the energetic polymer nanocomposite 40 is disposed at a distance less than 40%, less than 30%, less than 25%, less than 15%, less than 10%, less than 5%, less than 2%, or at multiple locations across the overall thickness from one or more surfaces of the composite container.

Various composite containers are contemplated. In an embodiment, the composite container is a rocket motor case. Without wishing to narrow this disclosure, in embodiments a rocket motor case is a structural component of a rocket which houses the rocket motor and propellant. A rocket motor case may be lined or may be unlined in various instances. In an embodiment, the rocket motor case is lined with Kevlar filled ethylene propylene diene terpolymer (EPDM) elastomer.

A rocket motor case formed from the fiber reinforced energetic composite 10 has the structural integrity and substantially the same mechanical properties of a traditional composite rocket motor case. However, the inclusion of the energetic polymer nanocomposite 40 within the structure of the reinforced composite material allows for activation of the core-shell nanoparticles 50 and destruction of the structural integrity of the rocket motor case in the event of a fire or other excessive heat source during transport and storage of the motor case with the propellant. The ability to place the energetic polymer nanocomposite 40 through a majority of the three dimensional rocket motor case volume allows for the energetic polymer nanocomposite 40 to be near a potential fire or heat source regardless of location. Destruction of the structural integrity of the rocket motor case is desirable as such allows the fuel contained therein to quickly vent and be released without the risk of pressure build-up within the rocket motor case. As a result of the pressure venting or release of the fuel, a fire that is localized to a relatively smaller area would occur instead of deflagration, explosion or detonation of the fuel or propellant, which would lead to more catastrophic damage over a much larger area. Destruction of the structural integrity of the rocket motor case is achieved because the core-shell nanoparticles 50, in the form of a nanothermite for example, are ignited at a temperature low enough to prevent pressure build-up from the heated fuel or propellant and the core-shell nanoparticles 50 may burn and weaken the fiber reinforced energetic composite 10 at a second point away from the external flame or heat source, for example, a surface proximate the internal surface of the fiber reinforced energetic composite 10. The additional heat from the core-shell nanoparticles 50 results in quicker destruction of the mechanical integrity of the rocket motor case. The fiber reinforced energetic composite 10 may be used for the construction of other sealed vessels as well where rupture is desirable in the event of a fire in the immediate area of the sealed vessel.

Composite rocket motor cases have previously been made with carbon fiber and epoxy resin in a filament winding process. A filament winding process involves wrapping a plurality of filaments or tapes of carbon fiber around a mandrel or mold to build-up a carbon fiber structure incrementally as layers. In an embodiment, the energetic polymer nanocomposite 40 is integrated onto the fiber reinforced energetic composite 10 through a filament winding process. Specifically, filament or tape of the energetic polymer nanocomposite 40 is wrapped around a mandrel concurrently with filament or tape of the reinforcing fiber 20 such that the energetic polymer nanocomposite 40 becomes disposed between layers of the reinforcing fiber 20.

In an embodiment, the energetic polymer nanocomposite 40 is wrapped in the same direction as the wrapping of the reinforcing fiber 20. In further embodiments, the energetic polymer nanocomposite 40 is wrapped in an opposite direction or at an angle askew to the wrapping of the reinforcing fiber 20. For conciseness limited examples are provided, but it will be appreciated that energetic polymer nanocomposite 40 may be concurrently or sequentially wrapped with reinforcing fiber 20 in accordance with any technique known to the industry.

In another embodiment, the composite container is a storage tank. Reinforced fiber storage tanks provide high strength storage capacity while minimizing storage tank weight. In an embodiment, the composite container is a pressurized tank.

Various methods of making a fiber reinforced energetic composite 10 are contemplated. In an embodiment, a method of making the fiber reinforced energetic composite 10 comprises providing a mold defining a shape for the fiber reinforced energetic composite; applying a plurality of reinforcing fiber 20 layers and energetic polymer nanocomposite 40 layers over the mold to produce a fiber layup; impregnating the reinforcing fiber 20 with a curable polymer 30, and curing the impregnated fiber layup to produce the fiber reinforced energetic composite 10. FIG. 1 illustrates an embodiments of the fiber reinforced energetic composite 10 with the plurality of reinforcing fiber 20 layers, energetic polymer nanocomposite 40, and curable polymer 30 detailed. In various embodiments, the reinforcing fiber 20 is impregnated with the curable polymer by wetting dry reinforcing fiber 20 with the curable polymer 30 before applying over the mold, infusing the fiber layup with the curable polymer 30 under vacuum conditions or with a resin pump, or supplying prepreg reinforcing fiber 20 with the curable resin 30 already impregnated into the reinforcing fiber 20.

As previously discussed, the energetic polymer nanocomposite 40 may comprise filaments, fibers, tapes, scrims, woven threads, films, powders, fiber coating or sizing in various embodiments. In an embodiment where the energetic polymer nanocomposite 40 comprises filaments, the filaments are formed by extruding the energetic polymer nanocomposite 40 and then drawing the extruded energetic polymer nanocomposite to form continuous filament or tape of the thermoplastic polymer matrix 60 with the core-shell nanoparticles 50 entrained therein. Alternatively, the energetic polymer nanocomposite filaments may be formed by a fiber spinning process with the energetic polymer nanocomposite 40 to form continuous fiber or filament thermoplastic polymer matrix 60 with the core-shell nanoparticles 50 entrained therein.

In an embodiment, the method of making the fiber reinforced energetic composite 10 comprises providing a mold defining a shape for the fiber reinforced energetic composite 10; applying a plurality of reinforcing fiber 20 layers over the mold to produce a fiber layup; sprinkling or spraying thermoplastic polymer powder onto the dry fibers between the fiber layers with or without the help of a tackifier or adhesive; covering the mold and fiber layup in a vacuum enclosure, infusing the fiber layup with uncured polymer resin, and a curing agent under vacuum conditions or with a resin pump, and curing the infused fiber layup to produce the fiber reinforced energetic composite 10. Depositing energetic polymer nanocomposite 40 in powder form onto the layers of reinforcing fiber 20 during the fiber layup allows for the core-shell nanoparticles 50 to be dispersed throughout the entirety of the fiber reinforced energetic composite 10.

EXAMPLES

Figure 6:
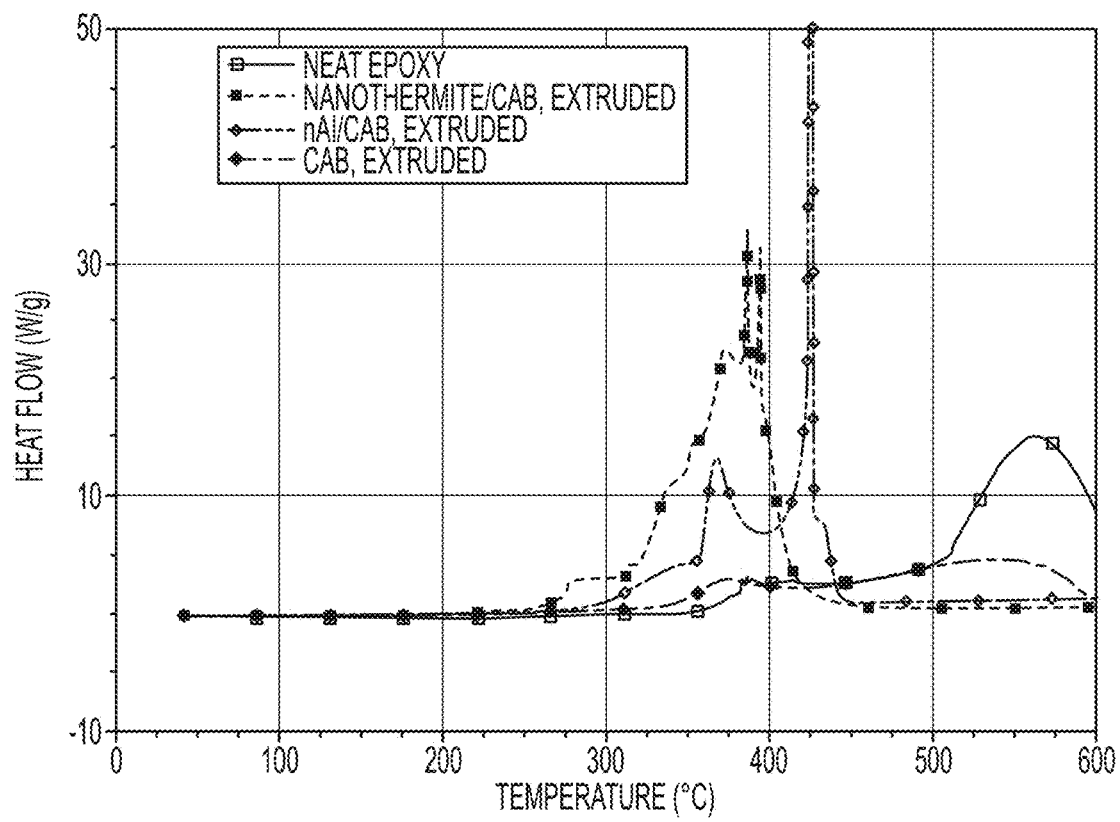
FIG. 6 is a differential scanning calorimetry (DSC) profile for each of epoxy, nanothermite in cellulose acetate butyrate (CAB), nanoaluminum in CAB, and CAB.
Figure 7:
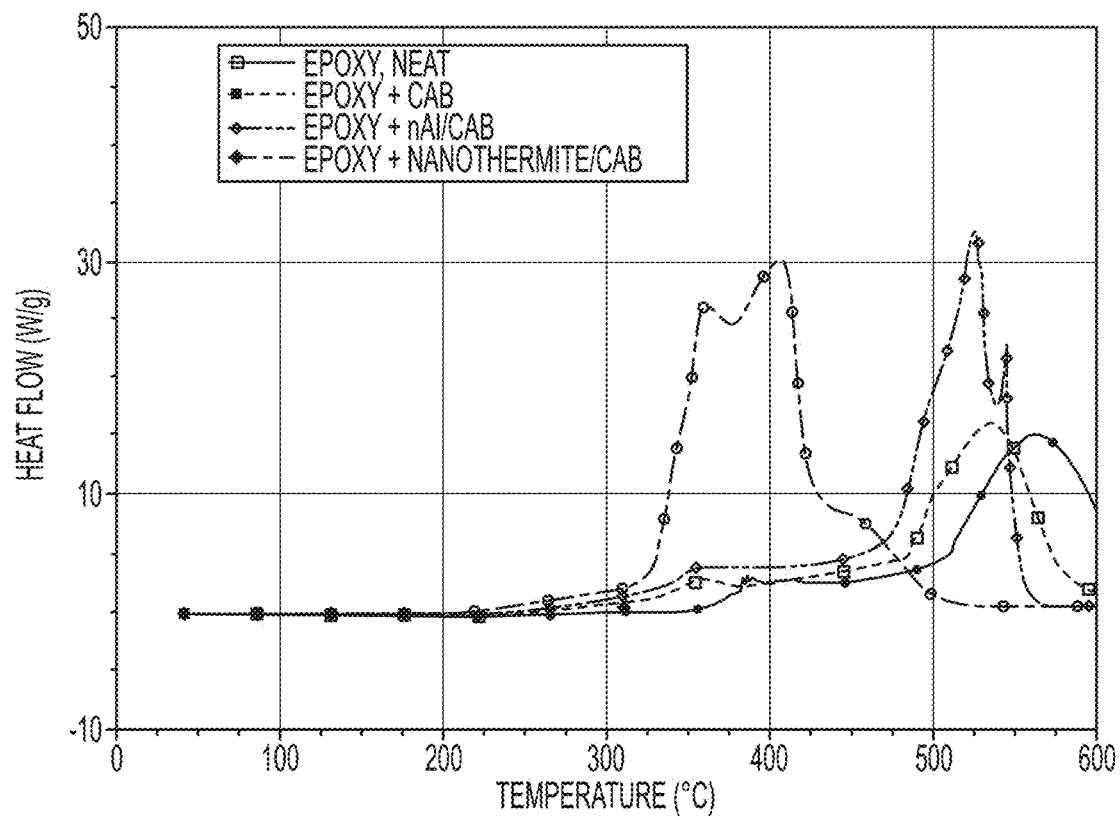
FIG. 7 is a DSC profile of for each of epoxy, epoxy and CAB, epoxy and nanoaluminum in CAB, and epoxy and nanothermite in CAB.

Fast cook-off (FCO) mitigation necessitates activation of the FCO mitigation system at a low enough temperature to avoid unintended detonation of the ammunition, propellant, or fuel contained in the storage tank or motor case. Comparative analysis of the energy release of individual components of the fiber reinforced energetic composite 10 and the assembled fiber reinforced energetic composite 10 was undertaken to determine usability in fast cook off (FCO) mitigation applications. Specifically, epoxy, core-shell nanoparticles that comprises a metal and a metal oxides (also known as nanothermite) entrained in CAB, nanoaluminum entrained in CAB, and CAB were each individually tested as well as CAB and epoxy, nanoaluminum entrained in CAB and epoxy, and nanothermite entrained in CAB and epoxy. The nanothermite entrained in CAB and epoxy represents an embodiment of the fiber reinforced energetic composite 10. With reference to FIG. 6, it may be seen that both nanothermite entrained in CAB and nanoaluminum entrained in CAB demonstrated good energy release profiles with the energy released at a reduced temperature. FIG. 6 represents a differential scanning calorimetry (DSC) profile for various components of the fiber reinforced energetic composite. Testing with the inclusion of epoxy in each sample indicates desirability of nanothermite over nanoaluminum as shown in FIG. 7. With reference to FIG. 7, a DSC profile for fiber reinforced energetic composite components in epoxy, it may be seen that nanothermite entrained in CAB and epoxy demonstrates a lower temperature for ignition than the other test specimens. It is desirable to have a lower ignition temperature in a FCO mitigation application such as within a composite rocket motor case. The lower ignition temperature allows for the motor case to rupture before the propellant, fuel or ammunition ignites. The motor case ruptures as a result of the energetic polymer nanocomposite 40 activation and weakening of the motor case structural integrity.

With reference to FIG. 7, the DSC profile of the nanothermite entrained in CAB and epoxy has a lower onset of combustion temperature than the comparative baseline sample that did not have nanothermite. The sample of nanothermite entrained in CAB and epoxy was made by mixing nanothermite/CAB powder into epoxy resin, the mixture was then cured and the resulting cured material was then analyzed by DSC. The nanothermite was a core-shell nanoparticle 50 with an aluminum core and a single iron oxide shell. This demonstrates that the core-shell nanoparticles 50 within the energetic polymer nanocomposite 40 of the fiber reinforced energetic composite 10 are desirable for FCO mitigation. Utilization of nanoaluminum which do not have the layered metal and metal oxide structure of the core-shell nanoparticles 50 did not demonstrate the same reduction in activation energy.

To test the FCO mitigation ability of the fiber reinforced energetic composite 10, coupons of various configurations of the placement of the energetic polymer nanocomposite 40 were prepared. Specifically, scrim or tape of energetic polymer nanocomposite 40 was laid up in multiple configurations within the reinforcing fiber 20. The energetic polymer nanocomposite 40 was placed at a combination of locations including mid-plane, proximal the bottom surface, and proximal the top surface. Mid-plane placement was substantially at 50% of the thickness of the fiber reinforced energetic composite 10. Proximal the bottom surface was placement of the energetic polymer nanocomposite 40 near the bottom surface (bag surface) of the fiber reinforced energetic composite 10 with one carbon layer between the energetic polymer nanocomposite 40 and the environment to prevent stress concentration on the surface. Similarly, proximal the top surface was placement of the energetic polymer nanocomposite 40 near the top surface (tool surface) of the fiber reinforced energetic composite 10 with one carbon layer between the energetic polymer nanocomposite 40 and the environment.

Comparative Example 1

Comparative Example 1 comprises a fiber reinforced composite without any energetic polymer nanocomposite 40. Comparative Example 1 was formed from eight layers of reinforcing fiber 20 with a unidirectional $[90]_8$ ply schedule and EPON™ 862/Epikure™ W epoxy resin as the cured polymer 30. This configuration is illustrated in FIG. 8.

Example 2

Figure 9:
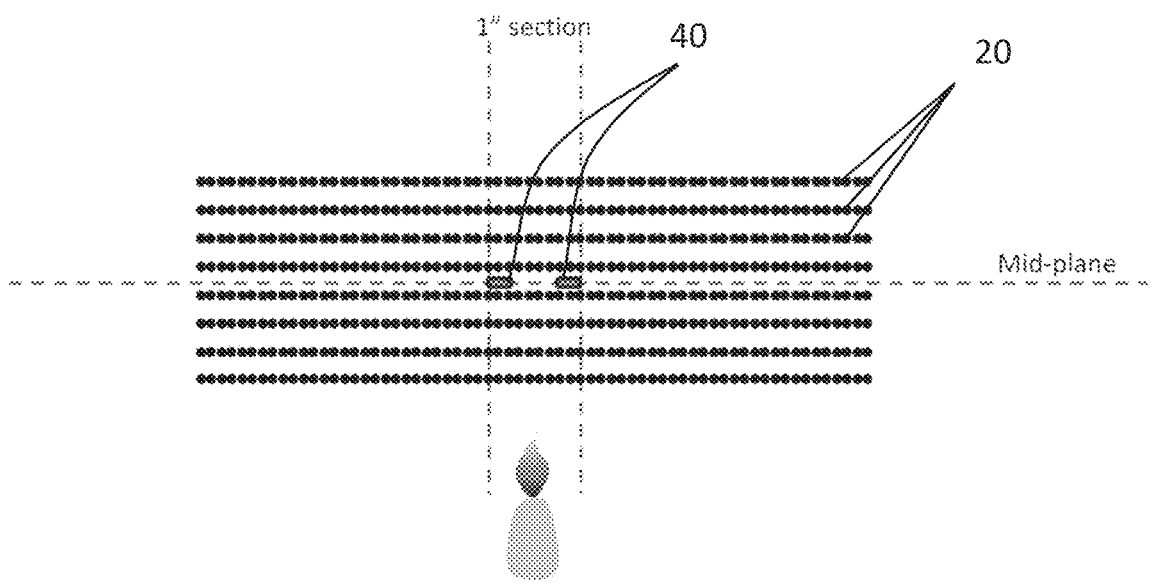
FIG. 9 is a schematic illustration of a fiber reinforced energetic composite according to one or more embodiments of the present disclosure used for simulated fast cook-off testing.

Example 2 comprises a fiber reinforced energetic composite 10 with the energetic polymer nanocomposite 40 provided as two tapes at mid-plane. Example 2 was formed from eight layers of reinforcing fiber 20 with a unidirectional $[90]_8$ ply schedule and EPON™ 862/Epikure™ W epoxy resin as the cured polymer 30. Additionally, aluminum nanoparticle embedded in a CAB polymer matrix was used as the energetic polymer nanocomposite 40. This configuration is illustrated in FIG. 9.

Example 3

Figure 10:
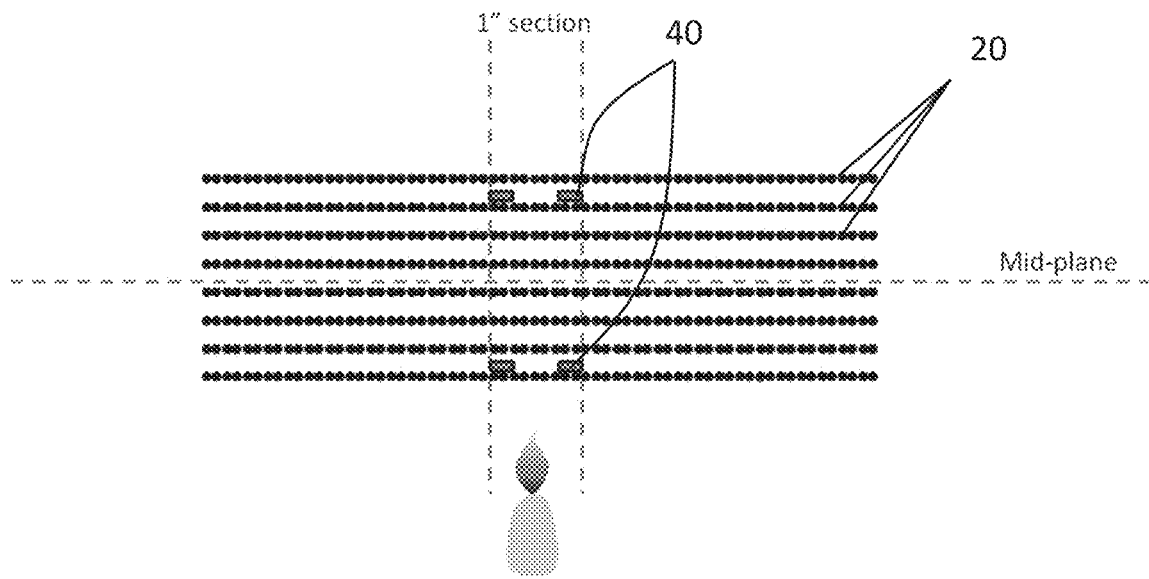
FIG. 10 is a schematic illustration of a fiber reinforced energetic composite according to one or more embodiments of the present disclosure used for simulated fast cook-off testing.

Example 3 comprises a fiber reinforced energetic composite 10 with the energetic polymer nanocomposite 40 provided as two tapes proximal each of the bottom surface and the top surface. Example 3 was formed from eight layers of reinforcing fiber 20 with a unidirectional $[90]_8$ ply schedule and EPON™ 862/Epikure™ W epoxy resin as the cured polymer 30. Additionally, aluminum nanoparticle embedded in a CAB polymer matrix was used as the energetic polymer nanocomposite 40. This configuration is illustrated in FIG. 10.

Example 4

Figure 11:
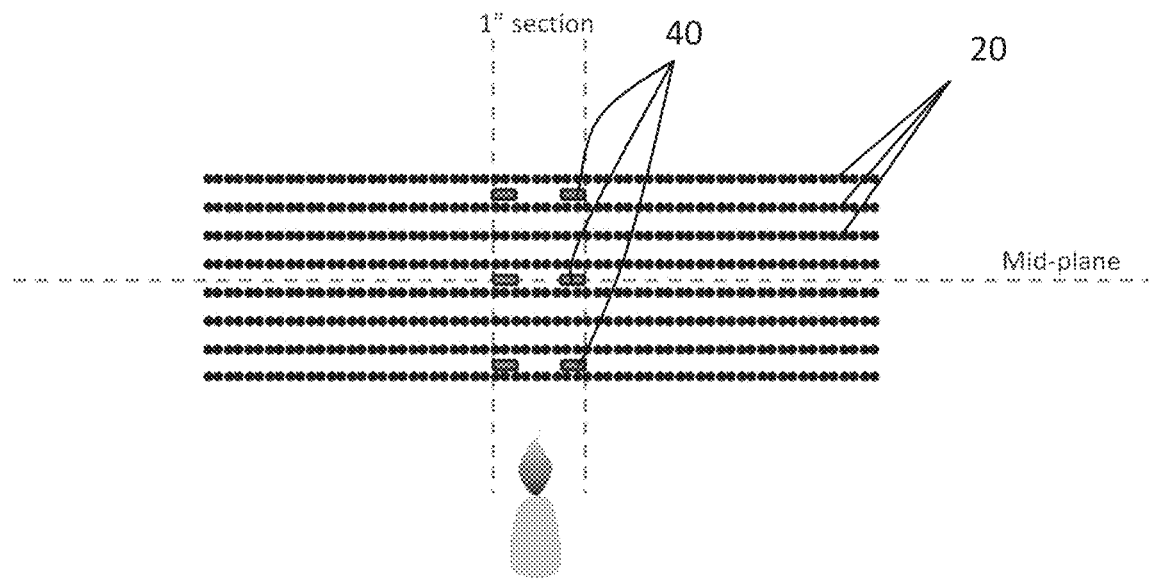
FIG. 11 is a schematic illustration of a fiber reinforced energetic composite according to one or more embodiments of the present disclosure used for simulated fast cook-off testing.

Example 4 comprises a fiber reinforced energetic composite 10 with the energetic polymer nanocomposite 40 provided as two tapes at mid-plane, two rapes proximal the bottom surface, and two tapes proximal the top surface. Example 4 was formed from eight layers of reinforcing fiber 20 with a unidirectional $[90]_8$ ply schedule and EPON™ 862/Epikure™ W epoxy resin as the cured polymer 30. Additionally, aluminum nanoparticle embedded in a CAB polymer matrix was used as the energetic polymer nanocomposite 40. This configuration is illustrated in FIG. 11.

Example 5

Figure 12:
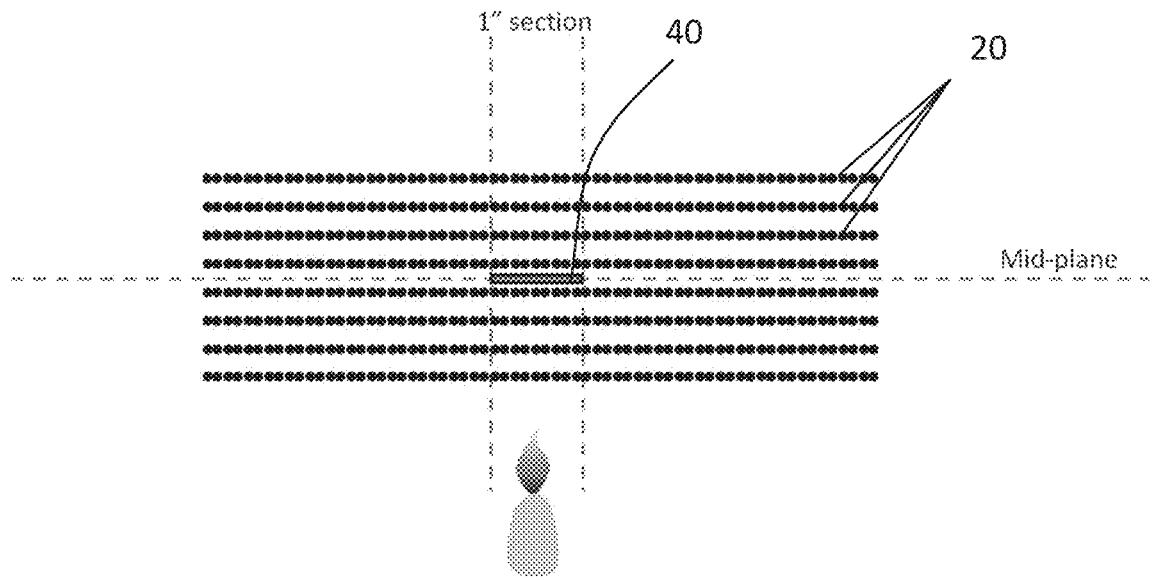
FIG. 12 is a schematic illustration of a fiber reinforced energetic composite according to one or more embodiments of the present disclosure used for simulated fast cook-off testing.

Example 5 comprises a fiber reinforced energetic composite 10 with the energetic polymer nanocomposite 40 provided as one scrim at mid-plane. Example 5 was formed from eight layers of reinforcing fiber 20 with a unidirectional $[90]_8$ ply schedule and EPON™ 862/Epikure™ W epoxy resin as the cured polymer 30. Additionally aluminum nanoparticle embedded in a CAB polymer matrix was used as the energetic polymer nanocomposite 40. This configuration is illustrated in FIG. 12.

Example 6

Figure 13:
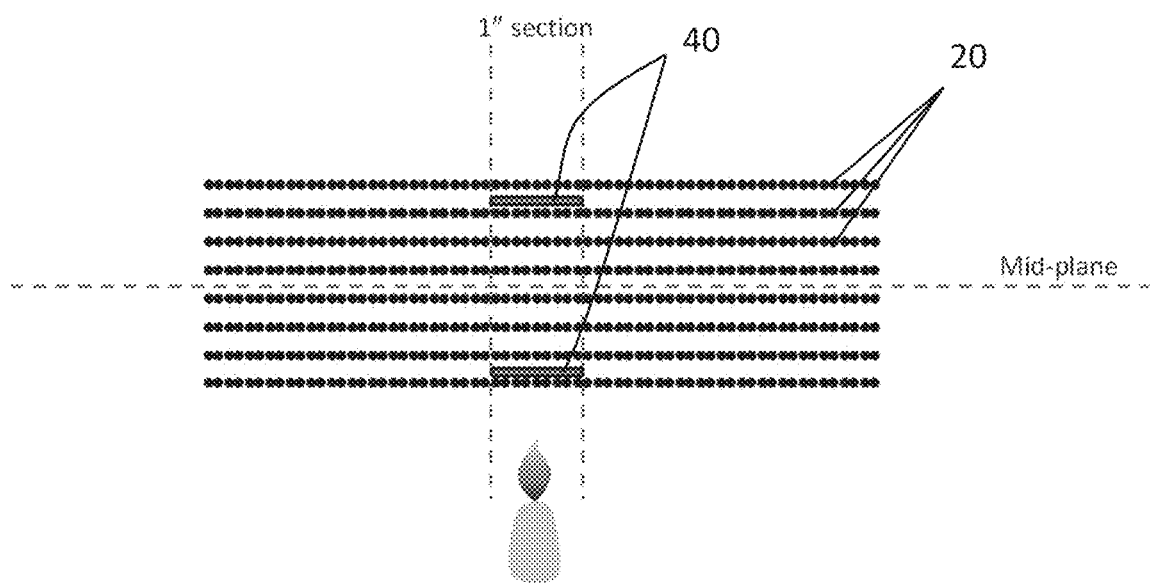
FIG. 13 is a schematic illustration of a fiber reinforced energetic composite according to one or more embodiments of the present disclosure used for simulated fast cook-off testing.

Example 6 comprises a fiber reinforced energetic composite 10 with the energetic polymer nanocomposite 40 provided as one scrim proximal the top surface and one scrim proximal the bottom surface. Example 6 was formed from eight layers of reinforcing fiber 20 with a unidirectional $[90]_8$ ply schedule and EPON™ 862/Epikure™ W epoxy resin as the cured polymer 30. Additionally, aluminum nanoparticle embedded in a CAB polymer matrix was used as the energetic polymer nanocomposite 40. This configuration is illustrated in FIG. 13.

Example 7

Figure 14:
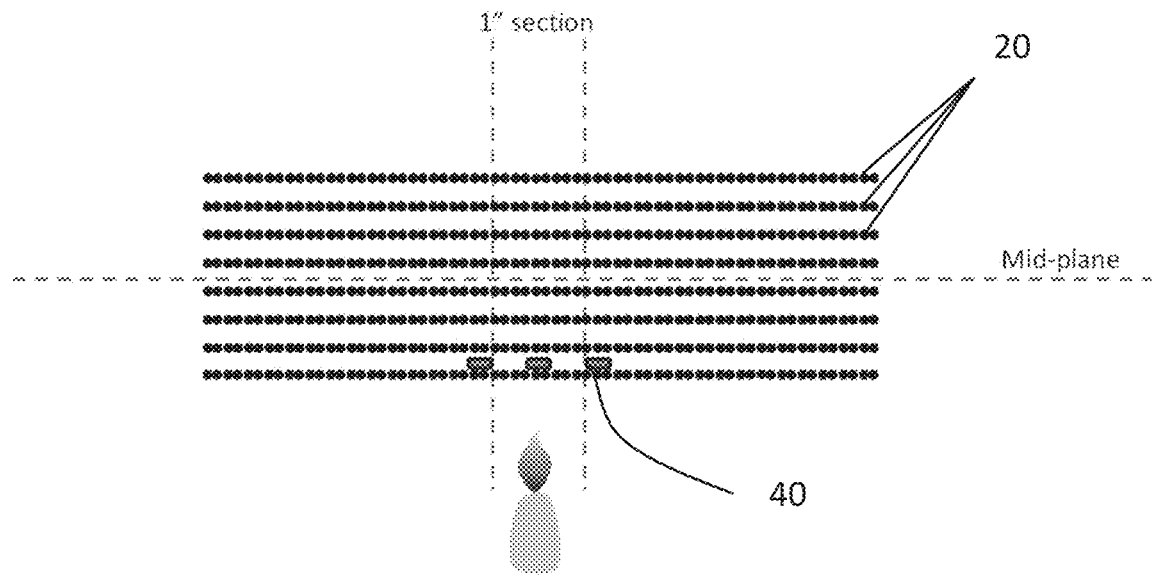
FIG. 14 is a schematic illustration of a fiber reinforced energetic composite according to one or more embodiments of the present disclosure used for simulated fast cook-off testing.

Example 7 comprises a fiber reinforced energetic composite 10 with the energetic polymer nanocomposite 40 provided as three tapes proximal the bottom surface. Example 7 was formed from eight layers of reinforcing fiber 20 with a unidirectional [90]$_8$ ply schedule and EPON™ 862/Epikure™ W epoxy resin as the cured polymer 30. Additionally, the core-shell nanoparticles 50 in CAB polymer matrix are nanothermite with an aluminum core and an iron oxide shell layer. This configuration is illustrated in FIG. 14.

Example 8

Figure 15:
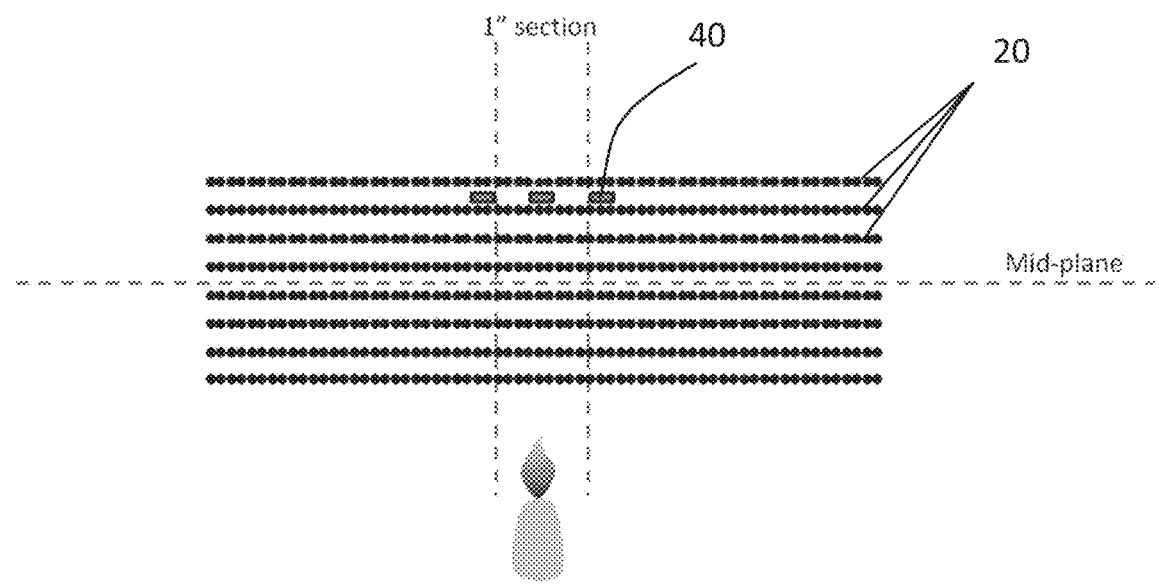
FIG. 15 is a schematic illustration of a fiber reinforced energetic composite according to one or more embodiments of the present disclosure used for simulated fast cook-off testing.
Figure 16:
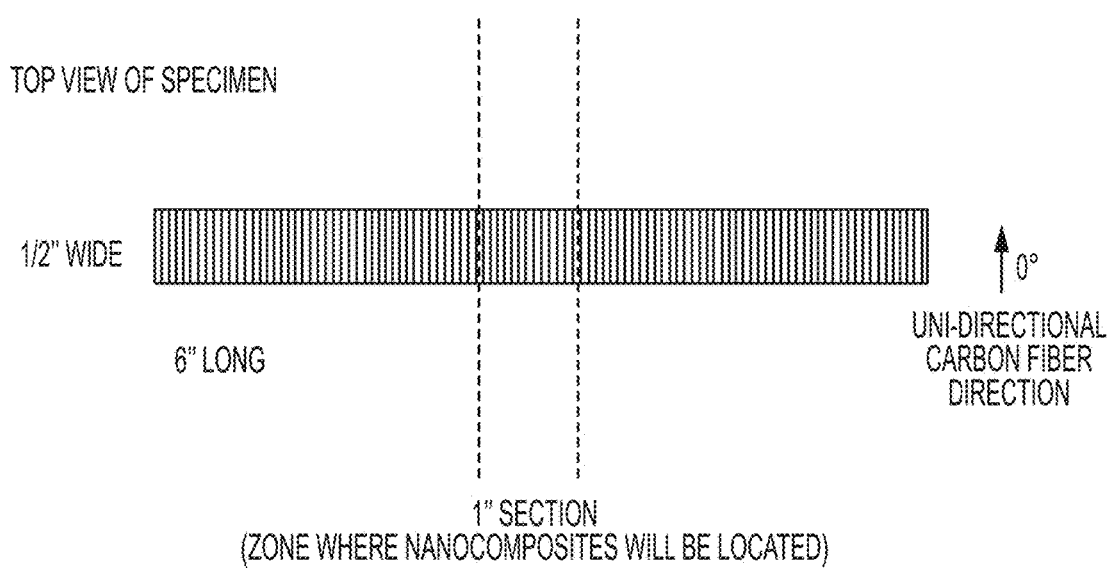
FIG. 16 is a schematic illustration of a top view of a fiber reinforced energetic composite specimen used for simulated fast cook-off testing.

Example 8 comprises a fiber reinforced energetic composite 10 with the energetic polymer nanocomposite 40 provided as three tapes proximal the top surface. Example 8 was formed from eight layers of reinforcing fiber 20 with a unidirectional [90]$_8$ ply schedule and EPON™ 862/Epikure™ W epoxy resin as the cured polymer 30. Additionally, the core-shell nanoparticles 50 in a CAB polymer matrix are nanothermite with an aluminum core and an iron oxide shell layer. This configuration is illustrated in FIG. 15.

For ease of reference, the energetic polymer nanocomposite 40 placement for Comparative Example 1 and Examples 2 through 8 are detailed infra in Table 1.

TABLE 1

| Configuration | Energetic Polymer Nanocomposite Placement |
| --- | --- |
| Comparative Example 1 | No energetic polymer nanocomposite |
| Example 2 | Two tapes at 50% thickness (mid-plane) |
| Example 3 | Two tapes proximal each surface |
| Example 4 | Two tapes at 50% thickness and proximal each surface |
| Example 5 | One scrim at 50% thickness (mid-plane) |
| Example 6 | One scrim proximal each surface |
| Example 7 | Three tapes proximal bottom surface (near flame) |
| Example 8 | Three tapes proximal top surface (away from flame) |

Tapes of energetic polymer nanocomposite 40 were prepared by extruding a nanothermite (core-shell nanoparticles 50) and CAB material (polymer matrix 60) blend into a thin ribbon. Specifically, energetic polymer nanocomposite 40 in powder form was processed through an extruder for consolidation. From the extruder, the energetic polymer nanocomposite 40 exited a die to yield a filament with a round cross-section which was subsequently fabricated into a thin ribbon by passage through a roller assembly. The ribbon thickness and width could be varied. The tape had a width of approximately 0.25 inches and a thickness of approximately 0.020 inches. Additionally, scrims of energetic polymer nanocomposite 40 were prepared by fusing energetic polymer nanocomposite powder on a carbon veil in a heat press. The scrim had a width of approximately 4 inches to 10 inches and a thickness of approximately 0.010 inches.

The coupons of fiber reinforced energetic composite 10 were tested in a simulated fast cook-off rupture test to determine the effect of the presence of the energetic polymer nanocomposite 40 on mechanical failure in a fast cook-off event. In field applications, for example as a rocket motor case, a pressure gradient between the interior and exterior of the composite container would cause rupture of the composite container. To impose a failure force for laboratory based repeatable testing, a tensile load was applied to each specimen and a heat source in the form of a MAP-Pro gas torch (BernzOmatic, Columbus, Ohio) was introduced to simulate a fire external to the composite container. The applied load was logged and the time at which the load dropped below a critical level was recorded for comparison of sample configurations.

Specifically, the test apparatus applied tensile load to a specimen with the top surface pointing upward and the bottom surface pointing downward. The test specimens were prepared in accordance with Comparative Example 1 and Examples 2 through 8 discussed supra where the composite panels were laid up with a unidirectional [90]$_8$ ply schedule with 7 inch by 8 inch dimensions. The test specimens were cut into 6 inch by 0.5 inch coupons with a 1 inch band centrally located across the 0.5 inch dimension comprising the energetic polymer nanocomposite 40. This arrangement is illustrated in FIGS. 8 and 9. A thermocouple (type J, 24 gauge) was placed on the top surface of each specimen and affixed with Kapton adhesive tape. Over the thermocouple a 9 inch by 4 inch by 1 inch piece of ceramic fiber insulation was placed to focus heat and increase the consistency of the testing. A MAP-Pro gas torch was slid underneath the specimen at a set and repeatable height and location. For the test specimens EPON™ 862/Epikure™ W resin was utilized as the cured polymer 30 which when cured at 350° F. for 2.5 hours has a strength of 11.4 ksi, a modulus of 394 ksi, and an elongation of 7.1% according to the manufacturer product bulletin. Each specimen was preloaded at 20% of the maximum stress of the epoxy resin. With a cross-sectional area of 0.1 in$^2$, a load of 228 lbs was applied to all specimens before introduction of the MAP-Pro gas torch. The MAP-Pro gas torch was position with the torch tip 3.25 inches below the bottom surface of the test specimen with the flame adjusted such that the blue flame was 1 inch tall. The load cell was logged at a 2 Hz sampling frequency and the temperature was logged at a 4 Hz sampling frequency.

The various configurations of the energetic polymer nanocomposite 40 placement in the test specimens of the fiber reinforced energetic composite 10 were initially tested with a drop in load below 50 lbs considered failure of the sample. The results for each configuration are provided infra in Table 2.

TABLE 2

Time and Temperature of Top Surface at Load = 50 lbs

| Configuration | Time (sec) | Top Surface Temperature (° C.) |
| --- | --- | --- |
| Comparative Example 1 Tool surface away from flame | 13.3 | 101 |
| Comparative Example 1 Tool surface near flame | 12.5 | 106 |
| Example 2 | 15.7 | 105 |
| Example 3 | 19.0 | 128 |
| Example 4 | 17.7 | 108.2 |
| Example 6 | 16.0 | 77 |
| Example 7 | 15.3 | 89.2 |
| Example 8 | 8.3 | 40 |

Figure 17:
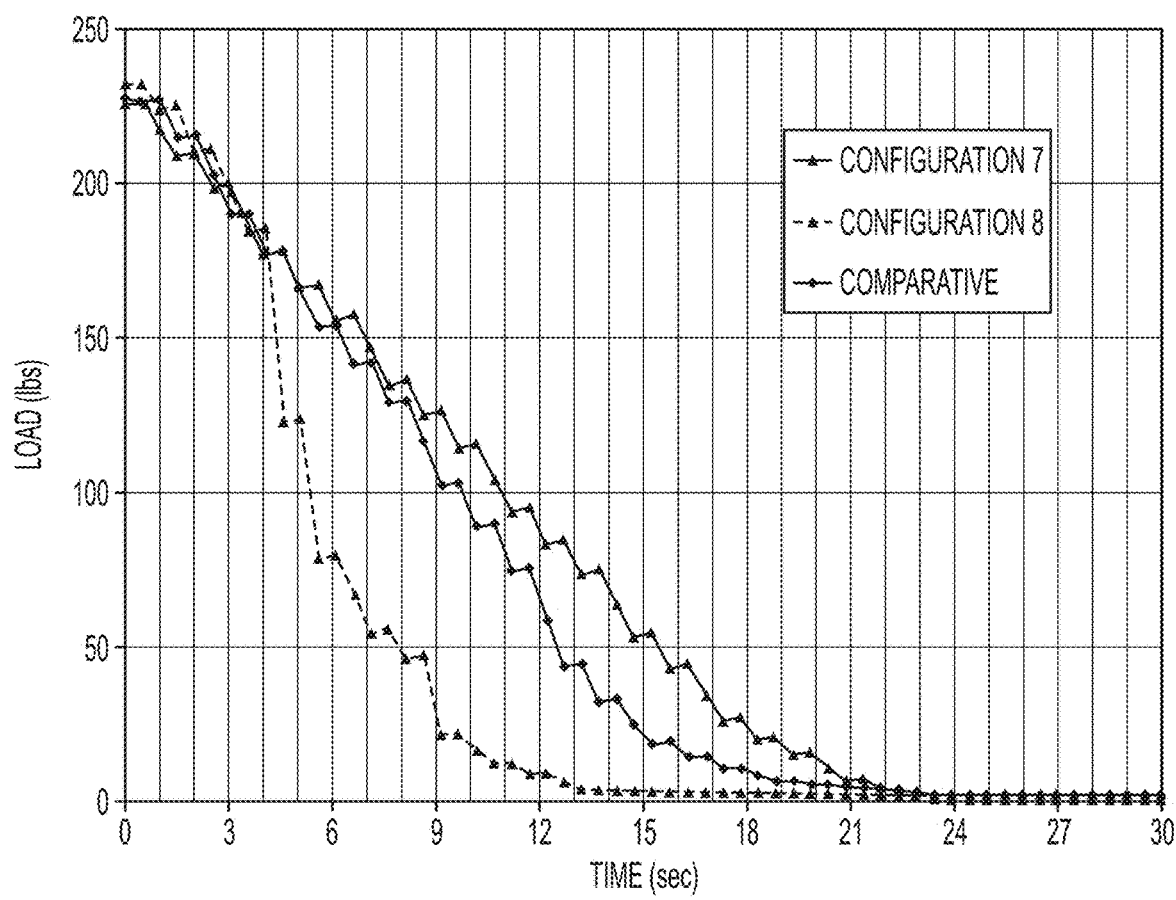
FIG. 17 is a graph of tensile load on fiber reinforced energetic composite test specimens over time when subjected to an open flame in simulated fast cook-off testing.
Figure 18:
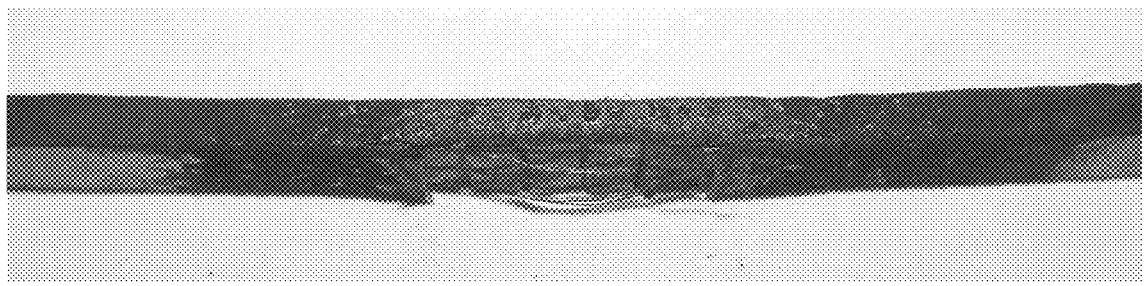
FIG. 18 is an image of a side profile of a comparative reinforced composite without an energetic polymer nanocomposite after tensile testing.
Figure 19:
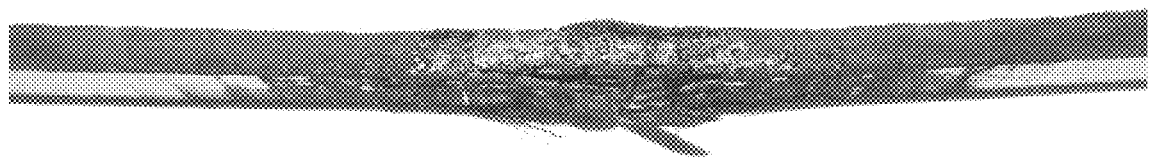
FIG. 19 is an image of a side profile of a fiber reinforced energetic composite with nanothermite proximal the top surface after tensile testing.

As demonstrated in Table 2, the inclusion of energetic polymer nanocomposite 40 allows for a reduced temperature at the surface of the composite away from the heat source at the time of composite rupture. For example, Example 8 (three tapes of nanothermite energetic polymer nanocomposite proximal the top surface) exhibits a time to failure at 50 lbs 30% faster than for Comparative Example 1 (comparative sample with no energetic polymer nanocomposite). Additionally, the temperature of the top surface of the fiber reinforced energetic composite 10 opposite the flame for Example 8 was significantly lower (66° C.) than that of Comparative Example 1 (second entry in Table 2). The reduction in both time and temperature at failure empirically demonstrates the ability for inclusion of the energetic polymer nanocomposite 40 in the fiber reinforced energetic composite 10 to allow the composite wall to quickly decompose from both sides while remaining cool near the interior surface of a composite container. The drop in load during the tensile testing is also graphically shown in FIG. 17 for Comparative Example 1 with the tool surface up/away from the flame, Example 7 (nanothermite energetic polymer nanocomposite near flame), and Example 8 (nanothermite energetic polymer nanocomposite away from flame). It is noted that the surface away from the flame was unaffected by the flame except for samples with the energetic polymer nanocomposite 40 proximal the top surface (surface away from the flame) having visual damage on the top surface as well. FIG. 18 illustrates Comparative Example 1 after testing with the damage concentrated on the bottom half the specimen near the flame. Conversely, FIG. 19 illustrates Example 8 with nanothermite energetic polymer nanocomposite away from the flame on the top surface where the specimen has visual damage across the top surface as well. The destructive force of the activated energetic polymer nanocomposite 40 is visibly shown in FIG. 19 with the damage to both the top and bottom surfaces.

A 20 inch inner diameter motor case was also manufactured. The motor case utilized filament winding of 6 k IM7 carbon fiber and EPON™ 862/Epikure™ W epoxy resin to form a fiber reinforced composite. Tapes of nanothermite and nanoaluminum core-shell nanoparticles were incorporated into the structure during the filament winding process. The completed 20 inch inner diameter motor case was placed over an open fire to test the initiation of the energetic polymer nanocomposite. The test demonstrated accelerated destruction of the motor case where the nanothermite was located as exhibited by flames following the nanothermite around the diameter of the motor case.

It should now be understood that various aspects of the fiber reinforced energetic composite and method of making the same are described and such aspects may be utilized in conjunction with various other aspects.

In a first aspect, the disclosure provides a fiber reinforced energetic composite. The fiber reinforced energetic composite comprises a reinforcing fiber embedded in a cured polymer matrix, and an energetic polymer nanocomposite disposed in the reinforcing fiber. The energetic polymer nanocomposite comprises core-shell nanoparticles entrained in a polymer matrix, where the core-shell nanoparticles comprise a core comprising a metal and at least one shell layer comprising a metal oxide disposed on the core or a core comprising a metal oxide and at least one shell layer comprising a metal disposed on the core.

In a second aspect, the disclosure provides a fiber reinforced energetic composite of the first aspect in which the polymer matrix of the energetic polymer nanocomposite comprises thermoplastic polymer fibers, filaments, tapes, films, powders, fiber coating, fiber sizing, or combinations thereof.

In a third aspect, the disclosure provides a fiber reinforced energetic composite of the first aspect or second aspect in which the reinforcing fiber comprises filaments, fiber, tape, scrim, woven thread, or combinations thereof.

In a fourth aspect, the disclosure provides a fiber reinforced energetic composite of any of the first through third aspects in which the reinforcing fiber comprises a plurality of woven sheets of reinforcing fibers.

In a fifth aspect, the disclosure provides a fiber reinforced energetic composite of any of the first through fourth aspects in which the reinforcing fiber comprises carbon fiber, glass fiber, reinforcing polymer fiber, or combinations thereof.

In a sixth aspect, the disclosure provides a fiber reinforced energetic composite of any of the first through fifth aspects in which the energetic polymer nanocomposite is disposed between layers of the reinforcing fiber before curing.

In a seventh aspect, the disclosure provides a fiber reinforced energetic composite of any of the first through sixth aspects in which the energetic polymer nanocomposite is disposed at one or more locations at a distance less than 50% based on overall thickness from one or more surfaces of the fiber reinforced energetic composite.

In an eighth aspect, the disclosure provides a fiber reinforced energetic composite of any of the first through seventh aspects in which the energetic polymer nanocomposite is disposed at one or more locations at a distance less than 15% based on overall thickness from one or more surfaces of the fiber reinforced energetic composite.

In a ninth aspect, the disclosure provides a fiber reinforced energetic composite of any of the first through eighth aspects in which the cured polymer comprises epoxy, vinyl ester, polyurethane, phenolic resin, cyanate ester, polyimide, or combinations thereof.

In a tenth aspect, the disclosure provides a fiber reinforced energetic composite of any of the first through ninth aspects in which the metal is elemental aluminum, boron, lithium, beryllium, or combinations thereof and the metal oxide is iron oxide, copper oxide, cobalt oxide, or combinations thereof.

In an eleventh aspect, the disclosure provides a fiber reinforced energetic composite of any of the first to tenth aspects in which a barrier layer is disposed between the metal and metal oxide.

In a twelfth aspect, the disclosure provides a fiber reinforced energetic composite of any of the first to eleventh aspects in which the polymer matrix comprises cellulose acetate butyrate (CAB).

In a thirteenth aspect, the disclosure provides a fiber reinforced energetic composite of any of the first to eleventh aspects in which the polymer matrix comprises polyethersulfone (PES), CAB, polyimides, polyamides, polyalkylenes, modified cellulose derivatives, starches, polyesters, polymethacrylates, polyacrylates, polyvinyl alcohol, polyvinyl acetate, polybutadiene, polyvinylpyrrolidone, polyacrylamide, poly(alkylene oxides), poly(vinyl chloride), polysiloxanes, or fluoropolymers, such as polyfluoroalkylenes, poly(fluoroalkyl vinyl ethers), fluorochloropolymers, and perfluoropolymers, or combinations thereof.

In a fourteenth aspect, the disclosure provides a fiber reinforced energetic composite of any of the first through thirteenth aspects in which the energetic polymer nanocomposite comprises 1 to 50 wt % of the core-shell nanoparticles.

In a fifteenth aspect, the disclosure provides a fiber reinforced energetic composite of any of the first to fourteenth aspects in which the fiber reinforced energetic composite comprises 0.1 to 10 wt % of the energetic polymer nanocomposite.

In a sixteenth aspect, the disclosure provides a composite container. The composite container comprising a container housing comprises a fiber reinforced energetic composite.

The fiber reinforced energetic composite comprises a reinforcing fiber embedded in a cured polymer matrix, and an energetic polymer nanocomposite disposed in the reinforcing fiber. The energetic polymer nanocomposite comprises core-shell nanoparticles entrained in a polymer matrix, where the core-shell nanoparticles comprise a core comprising a metal and at least one shell layer comprising a metal oxide disposed on the core or a core comprising a metal oxide and at least one shell layer comprising a metal disposed on the core.

In a seventeenth aspect, the disclosure provides a composite container of the seventeenth aspect in which the energetic polymer nanocomposite is disposed within the fiber reinforced energetic composite at one or more locations at a distance less than 50% based on overall thickness of the fiber reinforced energetic composite from one or more internal surfaces of the composite container.

In an eighteenth aspect, the disclosure provides a composite container of the sixteenth aspect or seventeenth aspect in which the composite container is a storage tank.

In a nineteenth aspect, the disclosure provides a composite container of the sixteenth through eighteenth aspects in which the composite container is a pressurized tank.

In a twentieth aspect, the disclosure provides a composite container of any of the sixteenth to nineteenth aspects in which the composite container is a rocket motor case.

In a twenty-first aspect, the disclosure provides a method of making a fiber reinforced energetic composite. The method comprises providing a mold defining a shape for the fiber reinforced energetic composite, providing an impregnated fiber layup over the mold, and curing the impregnated fiber layup to produce the fiber reinforced energetic composite. The impregnated fiber layup comprises a plurality of reinforcing fiber layers, an energetic polymer nanocomposite strips disposed on one or more of the plurality of reinforcing fiber layers, and polymer resin impregnated within the plurality of reinforcing fiber layers. The energetic polymer nanocomposite comprises core-shell nanoparticles entrained in thermoplastic polymer matrix filaments, powders, films, tapes, ribbons, scrims, fabrics fiber coatings, or fiber sizing, where the core-shell nanoparticles comprise a core comprising a metal and at least one shell layer comprising a metal oxide disposed on the core or a core comprising a metal oxide and at least one shell layer comprising a metal disposed on the core. The impregnation of polymer resin occurs by one or more of the following: wetting the reinforcing fiber layers with the polymer resin before applying the reinforcing fiber layers over the mold, infusing the reinforcing fiber layers with polymer resin after applying the reinforcing fiber layers over the mold, or supplying prepreg reinforcing fiber layers, wherein the prepreg reinforcing fiber layers included polymer resin already impregnated into the reinforcing fiber layers.

In a twenty-second aspect, the disclosure provides a method of the twenty-first aspect in which the energetic polymer nanocomposite layers comprises filaments, fibers, tapes, scrims, woven threads, films, powders, fiber coating or fiber sizing.

In a twenty-third aspect, the disclosure provides a method of the twenty-first aspect or the twenty-second aspect in which the energetic polymer nanocomposite layers comprise filaments. The filaments are formed by a fiber spinning process or by extruding the energetic polymer nanocomposite and drawing the extruded energetic polymer nanocomposite to form a filament of the thermoplastic polymer matrix with the core-shell nanoparticles entrained therein.

In a twenty-fourth aspect, the disclosure provides a method of any of the twenty-first through twenty-third aspects in which the curable polymer comprises epoxy.

In a twenty-fifth aspect, the disclosure provides a method of making a fiber reinforced energetic composite. The method comprises providing a mold defining a shape for the fiber reinforced energetic composite, applying a plurality of reinforcing fiber layers over the mold and applying energetic polymer nanocomposite in powder form onto and between the reinforcing fiber layers to produce a fiber layup, covering the mold and fiber layup in a vacuum enclosure, infusing the fiber layup with a mixture of uncured polymer resin and curing agent under vacuum conditions, and curing the infused fiber layup to produce the fiber reinforced energetic composite. The energetic polymer nanocomposite powder comprises core-shell nanoparticles entrained in a polymer matrix, where the core-shell nanoparticles comprise a core comprising a metal and at least one shell layer comprising a metal oxide disposed on the core or a core comprising a metal oxide and at least one shell layer comprising a metal disposed on the core.

In a twenty-sixth aspect, the disclosure provides a method of any of the twenty-first through twenty-fifth aspects in which the plurality of reinforcing fiber layers is a plurality of filaments, fibers, tapes, scrims, or woven sheets of reinforcing fibers.

In a twenty-seventh aspect, the disclosure provides a method of any of the twenty-first through twenty-sixth aspects in which the reinforcing fiber is a woven carbon fiber.

In a twenty-eighth aspect, the disclosure provides a method of any of the twenty-first through twenty-seventh aspects in which the metal is elemental aluminum, boron, lithium, beryllium, or combinations thereof and the metal oxide is iron oxide, copper oxide, cobalt oxide, or combinations thereof.

In a twenty-ninth aspect, the disclosure provides a method of any of the twenty-first through twenty-eighth aspects in which a barrier layer is disposed between the metal and metal oxide.

In a thirtieth aspect, the disclosure provides a method of any of the twenty-first through twenty-ninth aspects in which the thermoplastic matrix comprises cellulose acetate butyrate (CAB).

In a thirty-first aspect, the disclosure provides a method of any of the twenty-first through twenty-ninth aspects in which the thermoplastic matrix comprises polyethersulfone (PES), polyimides, polyamides, polyalkylenes, modified cellulose derivatives, starches, polyesters, polymethacrylates, polyacrylates, polyvinyl alcohol, polyvinyl acetate, polybutadiene, polyvinylpyrrolidone, polyacrylamide, poly(alkylene oxides), poly(vinyl chloride), polysiloxanes, or fluoropolymers, such as polyfluoroalkylenes, poly(fluoroalkyl vinyl ethers), fluorochloropolymers, and perfluoropolymers, or combinations thereof.

In a thirty-second aspect, the disclosure provides a method of any of the twenty-first through thirty-first aspects in which the energetic nanocomposite comprises 1 to 50 wt % of the core-shell nanoparticles.

In a thirty-third aspect, the disclosure provides a method of any of the twenty-first through thirty-second aspects in which the multilayer fiber reinforced energetic composite comprises 0.1 to 10 wt % of the energetic nanocomposite.

It is also noted that recitations herein of "at least one" component, element, etc., should not be used to create an inference that the alternative use of the articles "a" or "an" should be limited to a single component, element, etc.

Unless otherwise indicated, the disclosure of any ranges in the specification and claims are to be understood as including the range itself and also any range and individual value subsumed therein, as well as endpoints.

Throughout this disclosure reference is generally made to rocket motor cases when discussing the fiber reinforced energetic composite. This is merely for convenience and it will be appreciated that the fiber reinforced energetic composite may be utilized in other applications where fiber reinforced composites are generally used.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "where" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of making a fiber reinforced energetic composite, the method comprising:
    providing a mold or mandrel defining a shape for the fiber reinforced energetic composite;
    applying an impregnated fiber layup over the mold or mandrel,
        wherein the impregnated fiber layup comprises a fiber layup and polymer resin, the fiber layup formed from a plurality of reinforcing fiber layers and an energetic polymer nanocomposite disposed adjacent one or more of the plurality of reinforcing fiber layers, wherein the polymer resin is impregnated within the plurality of reinforcing fiber layers, and,
        wherein the energetic polymer nanocomposite comprises core-shell nanoparticles embedded in a thermoplastic polymer matrix in the form of filaments, powders, films, tapes, ribbons, scrims, fabrics, coatings, or fiber sizing, where the core-shell nanoparticles comprise a core comprising a metal and at least one shell layer comprising a metal oxide disposed on the core or a core comprising a metal oxide and at least one shell layer comprising a metal disposed on the core, the metal and metal oxide forming a thermite;
    wherein the impregnation of the plurality of reinforcing fiber layers with the polymer resin occurs by one or more of the following:
        wetting the reinforcing fiber layers with the polymer resin before applying the reinforcing fiber layers over the mold or mandrel;
        infusing the reinforcing fiber layers with the polymer resin after applying the reinforcing fiber layers over the mold or mandrel; or
        supplying prepreg reinforcing fiber layers, wherein the prepreg reinforcing fiber layers include the polymer resin already impregnated into the reinforcing fiber layers; and
    curing the impregnated fiber layup to produce the fiber reinforced energetic composite.

2. The method of making a fiber reinforced energetic composite of claim 1, where the plurality of reinforcing fiber layers is a plurality of filaments, fibers, tapes, scrims, or woven sheets of reinforcing fibers.

3. The method of making a fiber reinforced energetic composite of claim 1, where the metal is elemental aluminum, boron, lithium, beryllium, or combinations thereof and the metal oxide is iron oxide, copper oxide, cobalt oxide, or combinations thereof.

4. The method of making a fiber reinforced energetic composite of claim 1, where the energetic polymer nanocomposite comprises 1 to 50 wt % of the core-shell nanoparticles.

5. The method of making a fiber reinforced energetic composite of claim 1, where the fiber reinforced energetic composite comprises 0.1 to 10 wt % of the energetic polymer nanocomposite.

6. The method of making a fiber reinforced energetic composite of claim 1, where the polymer resin comprises epoxy.

7. The method of making a fiber reinforced energetic composite of claim 1, where the method includes:
    providing a mold defining a shape for the fiber reinforced energetic composite;
    applying the plurality of reinforcing fiber layers over the mold and applying the energetic polymer nanocomposite in powder form onto and between the reinforcing fiber layers to produce the fiber layup;
    covering the mold and fiber layup in a vacuum enclosure; and
    infusing the fiber layup with a mixture of the polymer resin in an uncured state and a curing agent under vacuum conditions to form the impregnated fiber layup.

8. The method of making a fiber reinforced energetic composite of claim 1, where:
    the reinforcing fiber forming the plurality of reinforcing fiber layers is in the form of filaments or tapes,
    the energetic polymer nanocomposite is in the form of filaments or tapes, and
    the energetic polymer nanocomposite and the reinforcing fiber are wrapped around the mold or mandrel such that the energetic polymer nanocomposite is disposed between layers of the reinforcing fiber to form the fiber layup.

9. The method of making a fiber reinforced energetic composite of claim 8, where the energetic polymer nanocomposite is wrapped in the same direction as the reinforcing fiber.

10. The method of making a fiber reinforced energetic composite of claim 8, where the energetic polymer nanocomposite is wrapped in the opposite direction as the reinforcing fiber.

11. The method of making a fiber reinforced energetic composite of claim 8, where the energetic polymer nanocomposite is wrapped at an angle askew to the reinforcing fiber.

12. The method of making a fiber reinforced energetic composite of claim 8, where the energetic polymer nanocomposite and the reinforcing fiber are wrapped around the mold or mandrel concurrently.

13. The method of making a fiber reinforced energetic composite of claim 8, where the energetic polymer nanocomposite and the reinforcing fiber are wrapped around the mold or mandrel in a repeating sequential manner.

14. The method of making a fiber reinforced energetic composite of claim 8, where the impregnation of the plurality of reinforcing fiber layers with the polymer resin comprises wetting the reinforcing fiber layers in the form of tapes or filaments with the polymer resin before wrapping the tapes or filaments over the mold or mandrel.

15. The method of making a fiber reinforced energetic composite of claim 8, where the impregnation of the plurality of reinforcing fiber layers with the polymer resin comprises infusing the reinforcing fiber layers with the polymer resin after applying the reinforcing fiber layers over the mold or mandrel.

16. The method of making a fiber reinforced energetic composite of claim 15, where the polymer resin is infused into the reinforcing fiber layers under vacuum conditions.

17. The method of making a fiber reinforced energetic composite of claim 8, where the filaments or tapes which form the plurality of reinforcing fiber layers are prepreg filaments or tapes impregnated with the polymer resin prior to wrapping around the mold or mandrel.

* * * * *